US012422128B1

(12) United States Patent
Smyth et al.

(10) Patent No.: US 12,422,128 B1
(45) Date of Patent: Sep. 23, 2025

(54) DECORATIVE ASSEMBLY FOR A LIGHT FIXTURE

(71) Applicant: TULIP GOODS CO., Dover, DE (US)

(72) Inventors: Lori Smyth, Austin, TX (US); Philip Powers, Lafayette, CO (US)

(73) Assignee: TULIP GOODS CO., Dover, DE (US)

( * ) Notice: Subject to any disclaimer, the term of this patent is extended or adjusted under 35 U.S.C. 154(b) by 0 days.

(21) Appl. No.: 18/901,585

(22) Filed: Sep. 30, 2024

(51) Int. Cl.
*F21V 17/10* (2006.01)
*F21V 1/04* (2006.01)
*F21V 17/16* (2006.01)

(52) U.S. Cl.
CPC .............. *F21V 17/105* (2013.01); *F21V 1/04* (2013.01); *F21V 17/108* (2013.01); *F21V 17/164* (2013.01)

(58) Field of Classification Search
CPC ..... F21V 17/105; F21V 17/108; F21V 17/164
See application file for complete search history.

(56) References Cited

U.S. PATENT DOCUMENTS 2,747,079 A * 5/1956 Kubiliunas ......... F21V 21/0965 362/388
3,388,248 A * 6/1968 Auerbach ............... F21V 17/00 362/453
3,524,981 A * 8/1970 Seymour ................. F21V 17/14 362/433
3,593,021 A * 7/1971 Auerbach ............. F21V 17/105 362/434
4,099,224 A * 7/1978 Valpey .................. F21V 17/164 362/453
4,344,114 A 8/1982 Denhart
4,716,671 A * 1/1988 Gross ...................... G09F 13/04 40/661
5,738,437 A * 4/1998 Ilagan ..................... F21V 17/14 362/311.1
6,467,209 B1 * 10/2002 Vickers ..................... F21V 1/22 52/762
6,851,211 B2 * 2/2005 Sender ...................... G09F 7/22 40/431
8,393,762 B2 3/2013 Wu
11,486,563 B1 11/2022 Smyth et al.
2006/0239011 A1 10/2006 Bin (Continued)

FOREIGN PATENT DOCUMENTS

CN 105889825 A 8/2016
CN 206488161 U 9/2017

(Continued)

*Primary Examiner* — Zheng Song
(74) *Attorney, Agent, or Firm* — Dickinson Wright PLLC

(57) ABSTRACT

A decorative assembly for covering and decorating a light fixture on a ceiling, the decorative assembly comprising a decoration with an upper end and a lower end opposite the upper end, the decoration comprises a frame adjacent the upper end and has an open central portion that is unobstructed. A ceiling magnet is configured to be directly attached to the ceiling for the decorative assembly. A frame magnet extends from the frame inward toward the open central portion for detachably coupling with the ceiling magnet and is configured to secure the decoration to the ceiling. The decorative assembly does not comprise the light fixture and, when assembled, no part of the decorative assembly contacts the light fixture.

8 Claims, 11 Drawing Sheets

(56) References Cited

U.S. PATENT DOCUMENTS

| | | | | |
|---|---|---|---|---|
| 2009/0103314 | A1* | 4/2009 | Hammer | F21V 17/105<br>362/351 |
| 2012/0206925 | A1 | 8/2012 | Shenk et al. | |
| 2016/0356430 | A1* | 12/2016 | Stratas | F21S 8/04 |
| 2017/0097145 | A1 | 4/2017 | Friz | |
| 2017/0299155 | A1* | 10/2017 | Bibi | F21V 1/20 |
| 2018/0347782 | A1 | 12/2018 | Brantley | |
| 2020/0363031 | A1* | 11/2020 | Jha | F21V 17/105 |
| 2021/0080074 | A1 | 3/2021 | Chen | |
| 2021/0372577 | A1* | 12/2021 | Lin | F21V 15/01 |
| 2023/0243487 | A1* | 8/2023 | Smyth | F21V 1/18<br>362/351 |
| 2023/0272891 | A1* | 8/2023 | Ji | F21V 15/015<br>362/249.02 |

FOREIGN PATENT DOCUMENTS

| | | | |
|---|---|---|---|
| CN | 208332014 | U | 1/2019 |
| CN | 209977730 | U | 1/2020 |
| CN | 210441050 | U | 5/2020 |
| KR | 200378270 | Y1 | 3/2005 |
| KR | 101393377 | B1 | 5/2014 |

* cited by examiner

DECORATIVE ASSEMBLY FOR A LIGHT FIXTURE

TECHNICAL FIELD

The present disclosure relates to ornamental assemblies and, in particular, to a decorative assembly for a light fixture.

BACKGROUND

There are many types of decorative assemblies for home furnishings, such as light fixtures. Over time, light fixtures can become outdated, less desirable or can be less than ideal for some forms of home entertainment. In other situations, it can be desirable to enhance or decorate an open space on a surface (e.g., a wall, ceiling, etc.) in a dwelling or business. Adding, updating and/or replacing ornamentations, such as light fixtures, can be costly and laborious. Thus, improvements in decorative assemblies continue to be of interest.

SUMMARY OF THE INVENTION

Embodiments according to the present disclosure can be applied to a variety of light fixtures, surfaces, or the like. In an embodiment, a decorative assembly for covering and decorating a light fixture on a ceiling includes a decoration with an upper end and a lower end opposite the upper end, the decoration comprises a frame adjacent the upper end and has an open central portion that is unobstructed. A ceiling magnet is configured to be directly attached to the ceiling for the decorative assembly. A frame magnet extends from the frame inward toward the open central portion for detachably coupling with the ceiling magnet and is configured to secure the decoration to the ceiling. The decorative assembly does not comprise the light fixture and, when assembled, no part of the decorative assembly contacts the light fixture.

In an embodiment, a decorative assembly for covering and decorating a light fixture on a ceiling comprises a decoration with an upper end and a lower end opposite the upper end, the decoration comprises a frame adjacent the upper end and has an open central portion that is unobstructed. At least two pods are configured to be mounted to the ceiling and are configured to be detachably coupled to the frame opposite each other to secure the decoration to the ceiling. The decorative assembly does not comprise the light fixture and, when assembled, no part of the decorative assembly contacts the light fixture.

In an embodiment, a decorative assembly for covering and decorating a light fixture on a ceiling comprises a decoration having an upper end, a lower end opposite the upper end, and a mounting mechanism adjacent the upper end, wherein the mounting mechanism has a protrusion that extends outwardly. A frame has an open central portion, wherein the frame comprises a side wall defining a perimeter of the frame, a lower portion extending from the side wall inward toward the open central portion, and an aperture defined by the lower portion for receiving the protrusion. The decoration is configured to be detachably coupled to the frame by the protrusion being inserted into the aperture and rotated such that the protrusion rests on the lower portion. The frame is configured to be mounted to the ceiling and configured to secure the decoration to the ceiling. The decorative assembly does not comprise the light fixture and, when assembled, no part of the decorative assembly contacts the light fixture.

In an embodiment, a decorative assembly for covering and decorating a light fixture on a ceiling comprises a decoration having an upper end, a lower end opposite the upper end, and a mounting mechanism adjacent the upper end, wherein the mounting mechanism is annularly shaped and comprises a plurality of protrusions extending outward radially. A frame has an annular shape and an open central portion, wherein the frame comprises a side wall defining a perimeter of the frame, a plurality of lower portions extending from the side wall inward toward the open central portion, and a plurality of apertures defined by the lower portions for receiving the respective ones of the plurality of protrusions. The mounting mechanism is configured to be detachably coupled to the frame by the plurality of protrusions being inserted into the plurality of apertures and rotated such that the plurality of protrusions rest on the each of the plurality of lower portions. The frame is configured to be mounted to the ceiling and configured to secure the decoration to the ceiling. The decorative assembly does not comprise the light fixture and, when assembled, no part of the decorative assembly contacts the light fixture.

In an embodiment, a decorative assembly for covering and decorating a light fixture on a ceiling comprises a frame with an annular shape and a mounting mechanism, wherein the mounting mechanism comprises a plurality of protrusions extending outward radially. A decoration having an upper end, a lower end opposite the upper end, wherein the decoration comprises a plurality of upper portions and a side wall adjacent the upper end, wherein plurality of the upper portions extends inwardly from the side wall and defines a plurality of apertures for receiving a respective one of the plurality of protrusions. The decoration is configured for detachably coupling to the frame by the plurality of protrusion being inserted into the plurality of apertures and rotated such that the plurality of upper portions rest on the respective one of the plurality of protrusions. The frame is configured to be mounted to the ceiling and for securing the decorative assembly to the ceiling. The decorative assembly does not comprise the light fixture and, when assembled, no part of the decorative assembly contacts the light fixture.

In an embodiment, a decorative assembly for covering and decorating a light fixture on a ceiling comprises a frame with an upper surface, a lower surface opposite the upper surface, and a plurality of connectors, wherein the frame is configured to be mounted to the ceiling. A decoration with an upper end, an open central portion that is unobstructed, and a plurality of couplers extending inwardly, wherein the plurality of connectors are configured to be detachably coupled respective to one of the plurality of connectors to secure the decoration to the ceiling. The decorative assembly does not comprise the light fixture and, when assembled, no part of the decorative assembly contacts the light fixture.

BRIEF DESCRIPTION OF THE DRAWINGS

In the following description, details are set forth to provide an understanding of the present disclosure and are not intended to limit the scope of the present disclosure. In some instances, certain systems, structures and techniques have not been described or shown in detail in order not to obscure the disclosure.

DETAILED DESCRIPTION OF THE ENABLING EMBODIMENTS

Figure 1A:
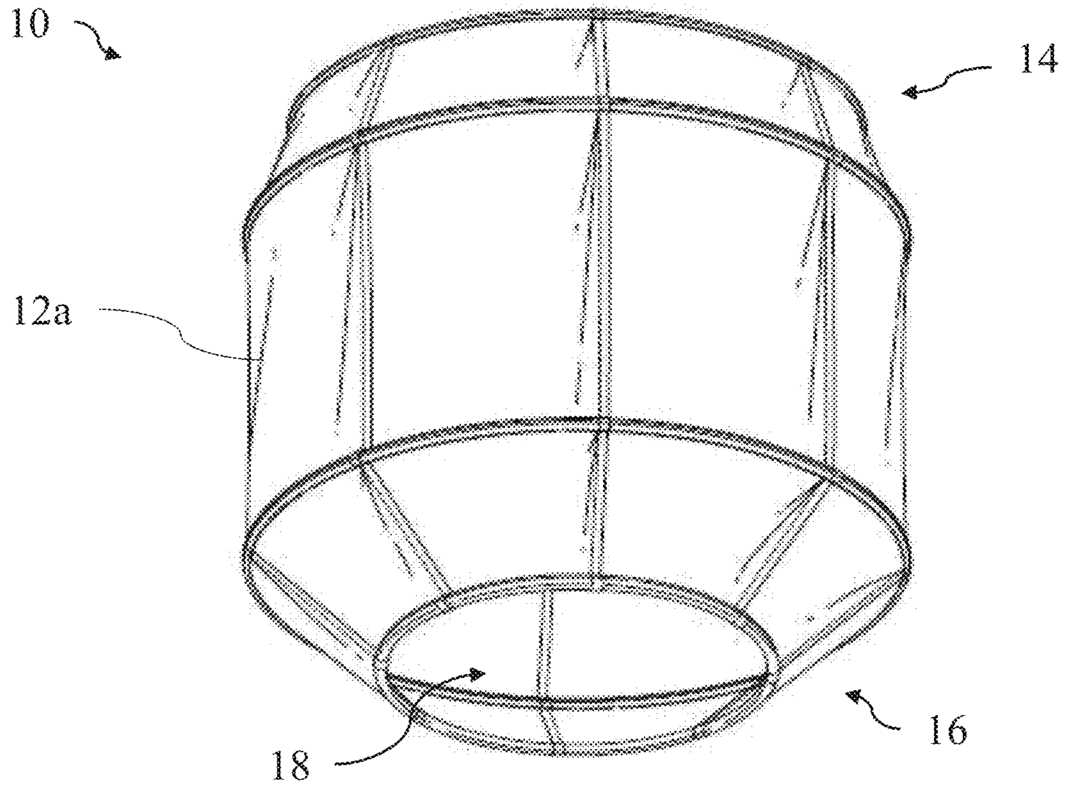
FIG. 1A-1D depict bottom isometric view of a decoration assembly including a decoration according to four embodiments of the present disclosure.
Figure 1B:
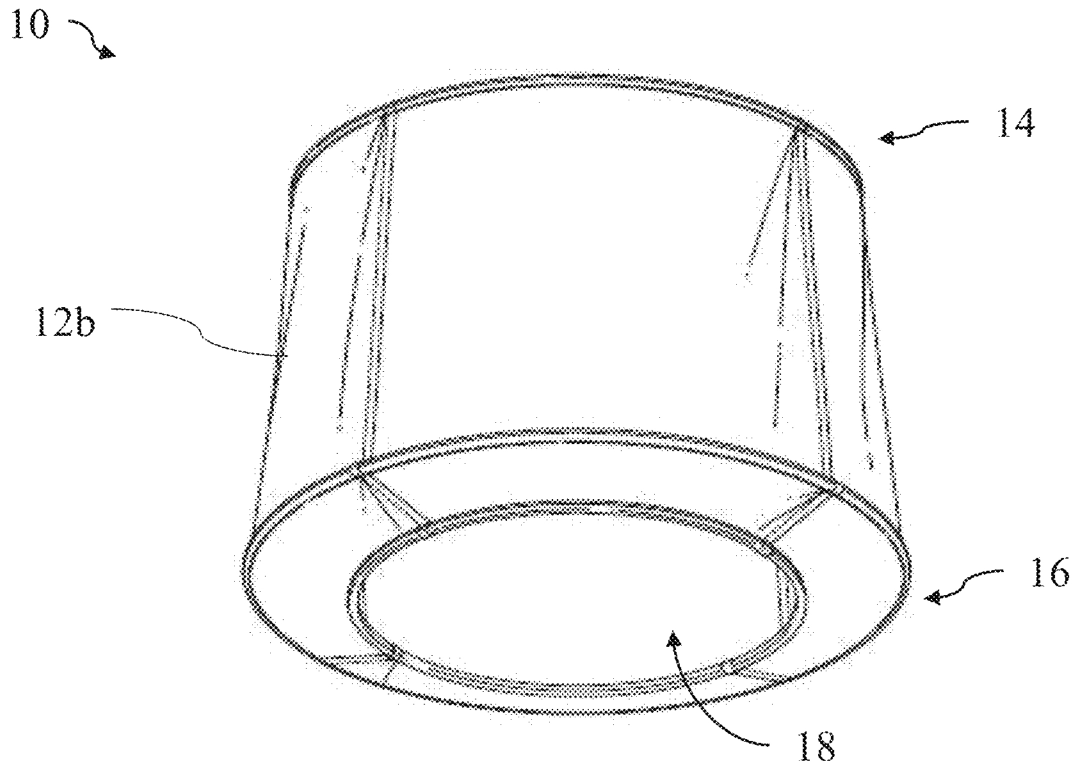
Figure 1C:
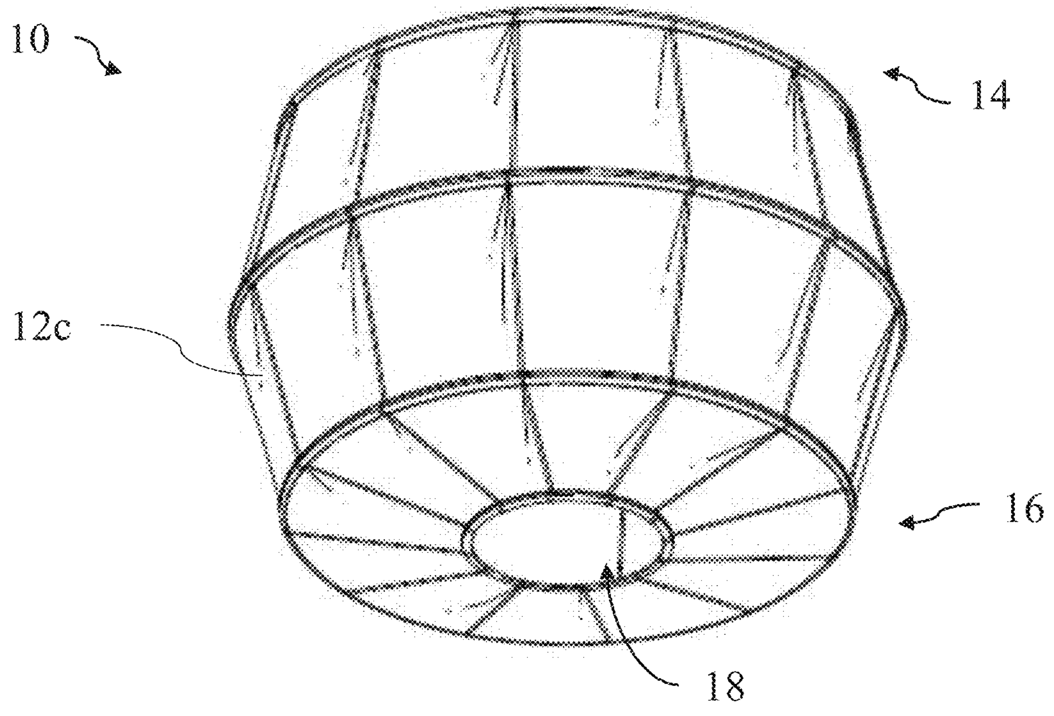
Figure 1D:
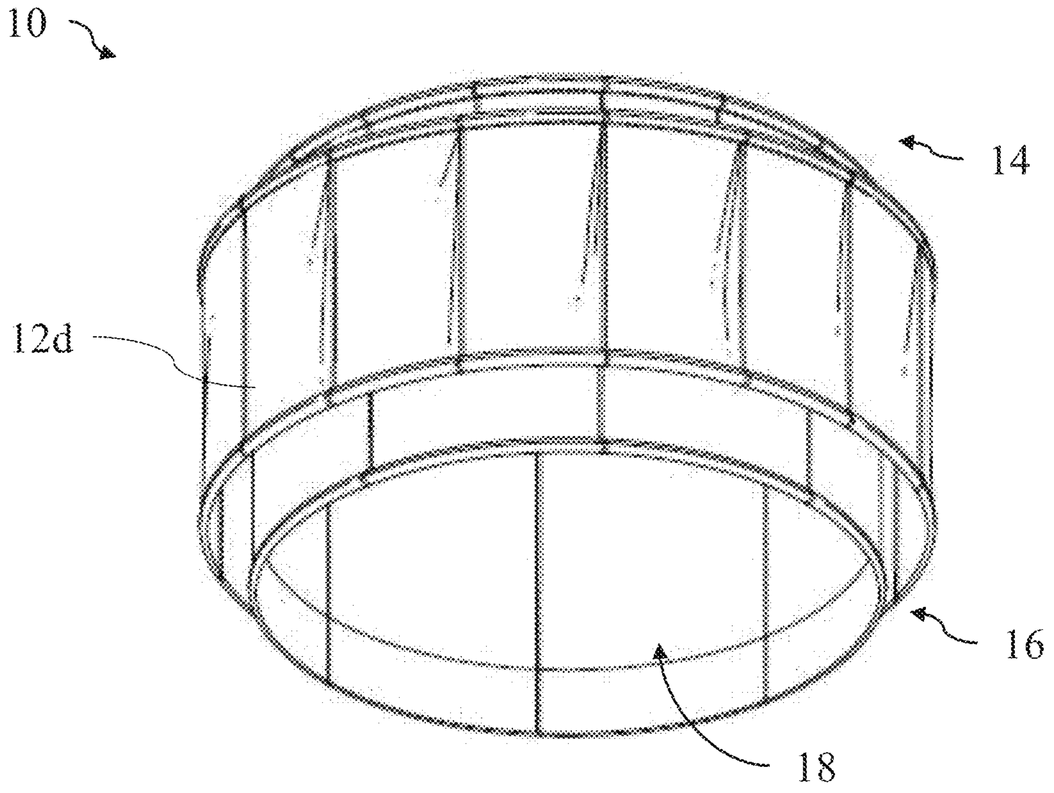

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

FIGS. 1A-1D depict various embodiments of a decoration assembly 10 including a decoration 12 with an upper end 14 and a lower end 16 opposite the upper end 14. The lower end 16 may include a lower opening 18 for directing light from a light fixture (i.e., a light source) or allowing light to pass through unimpeded. The light fixture includes one or more light sources with an electrical connection to a power source or a battery. The decoration 12 can include ornamental designs, a sculpture, or the like. The decoration 12 can comprise various sizes and shapes, such as a lantern shape, lamp shape, gem shape, drum shape, or the like, or a combination or sub-combination thereof. For example, the decorations 12*a*, 12*b*, 12*c*, and 12*d* exemplary depictions of the various sizes and shapes. The decoration 12 can be formed from various materials, such as fabric, paper, sewn materials, polymers, wood, or metal, or the like, or a combination or sub-combination thereof. The material composition of the decoration may determine an opacity of the decoration 12 such that the light from the light source may be directed more or less through the lower opening 18 or through a side surface 20 between the upper end 14 and the lower opening 18.

The decorative assembly 10 of the present disclosure can be used to cover and decorate an existing light fixture (e.g., a wall sconce without its light cover), or simply be attached to an open and undecorated wall or ceiling where there is no light source or any other feature. In this way, the decorative assembly 10 can be used to decorate and otherwise undecorated surface.

Figure 2:
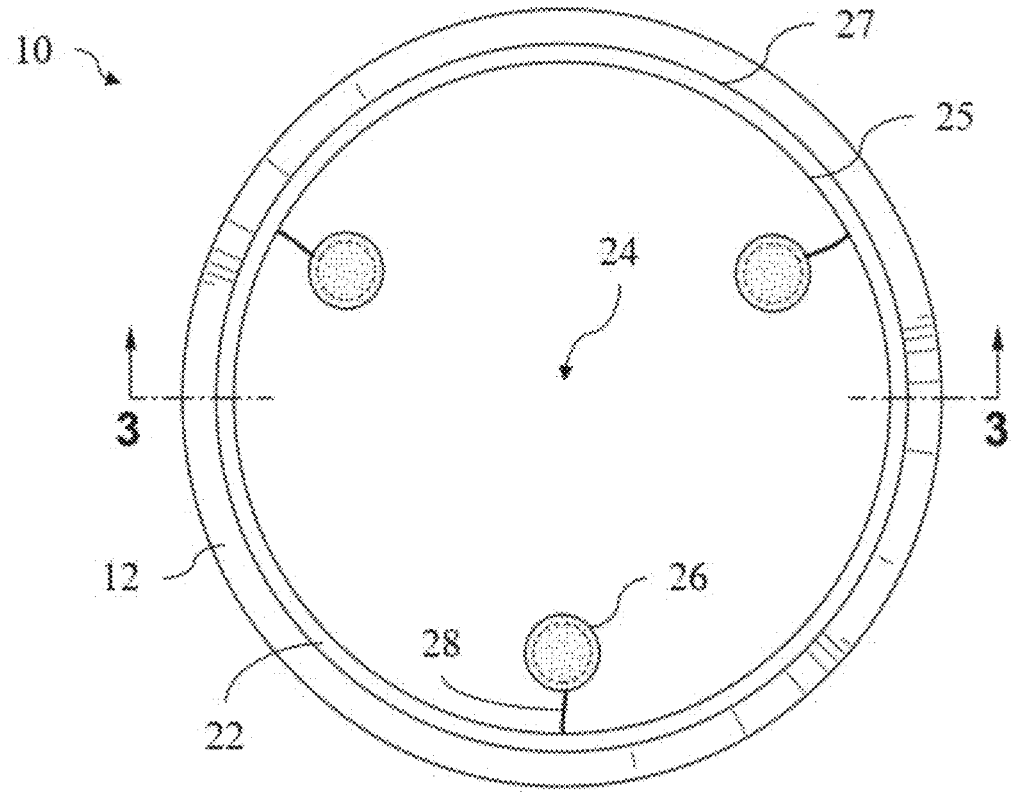
FIG. 2 is a bottom isometric view of an embodiment of the decoration assembly including a frame and frame magnets.
Figure 3:
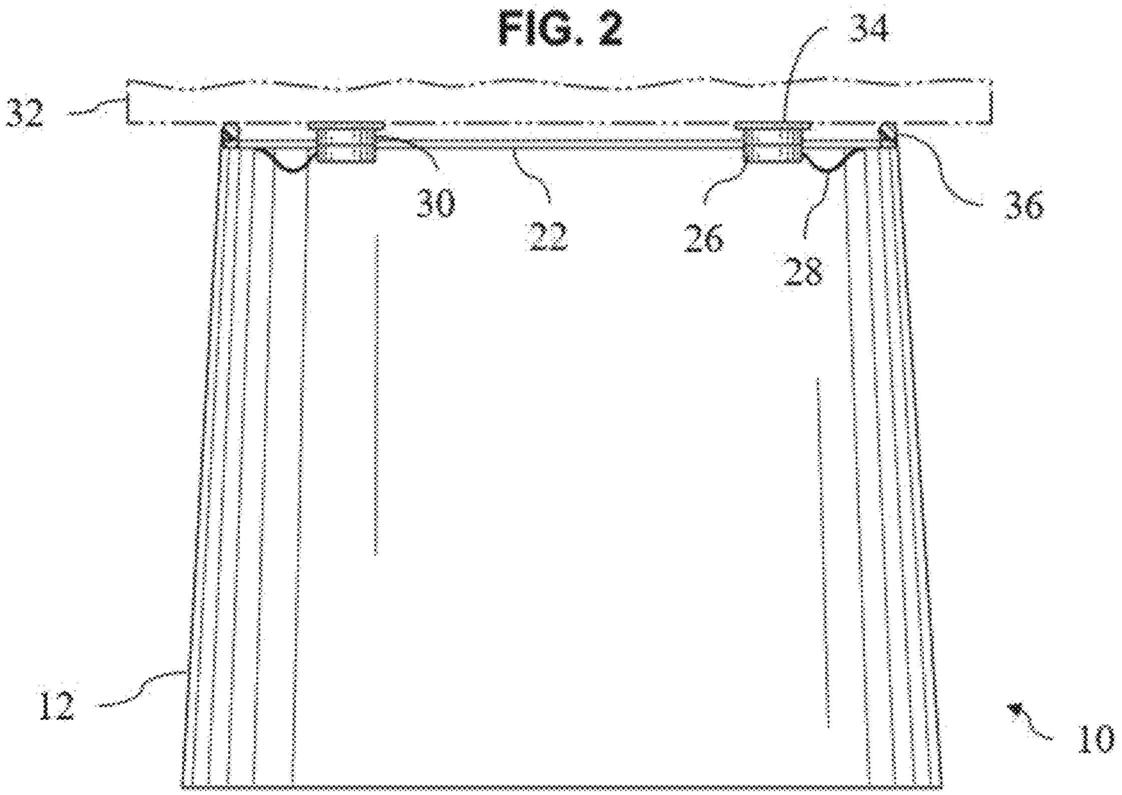
FIG. 3 is a cross-sectional side view of the decoration assembly shown in FIG. 2 detachably coupled to ceiling magnets attached to a ceiling.

Referring to FIGS. 2 and 3, in an embodiment the decoration 12 includes a frame 22 adjacent the upper end 16. The frame 22 may be integrally formed with or attached to the decoration 12. For example, the frame 22 may be adhered, sewn, or bound to the decoration 12. The frame 22 can have various shapes (e.g., circular, annular, rectangular, elliptical, triangular, or a polygon, or the like) with a uniform or non-uniform perimeter (e.g., the frame 22 may have a star polygon shape or an annular shape that has a wavy perimeter such that the frame 22 resembles a flower). The frame 22 may be composed of or include various materials such as a rigid polymer, metal, wood, or the like, or a combination or sub-combination thereof. In some embodiments, the frame 22 has a central portion 24 that is open and unobstructed. The central portion 24 may be defined by an inner perimeter 25 of the frame 22. In some embodiments, the inner perimeter 25 is defined by an inner diameter, or the like. The frame 22 includes an outer perimeter 27.

In an embodiment, the frame 22 includes a frame magnet 26 extending from the frame 22 inward toward the central portion 24. The frame magnet 26 is coupled to the frame 22 by a tether 28. In some embodiments, the tether 28 comprises a chain, a string, or the like. A ceiling magnet 30 is configured to be directly attached to a ceiling 32, or another surface such as a wall, by an adhesive 34, including a glue or removable adhesive strip with a release liner, or the like. The frame magnet 26 detachably couples to the ceiling magnet 30 by a magnetic force sufficient to secure the frame 22 to the ceiling 32 such that the decoration 12 extends downwards from the frame 22 and the ceiling 32 (i.e., the decoration 12 is suspended from the ceiling 32 by the frame magnet 26 being magnetically coupled to the ceiling magnet 30).

In some embodiments, the ceiling magnet 30 is attached to the ceiling 32 adjacent the light fixture. The frame 22 may be positioned such that the light fixture and ceiling magnet 32 are located within the central portion 24. The ceiling magnet 32 may be adjacent to or spaced apart from the inner perimeter 25 of the frame 22. The tether 28 may have a length configured to detachably couple the frame magnet 26 to the ceiling magnet 30 depending upon or regardless of the position of the ceiling magnet 30 within the central portion 24, and a rigidity or strength to secure the frame 22 to the ceiling 32. In some embodiments, the length of the tether 28 may be adjusted (i.e., shortened or lengthened). The decorative assembly 10 does not comprise the light fixture and, when assembled, no part of the decorative assembly 10 contacts the light fixture.

In an embodiment, the decorative assembly 10 includes a plurality of ceiling magnets 32 and the frame 22 includes a plurality of frame magnets 26 configured to detachably couple to respective ones of the plurality of ceiling magnets 30. In some embodiments, the decorative assembly 10 includes at least three ceiling magnets 32 and the frame 22 at least three frame magnets 26. The plurality of frame magnets 26 may be arranged for securing the frame 22 to the ceiling 32. In other words, the plurality of frame magnets 26 may be arranged uniformly along the frame 22 such that the weight of the frame 22 and the decoration 12 is evenly distributed between the plurality of magnets 26. Similarly, the plurality of ceiling magnets 30 may be attached to the ceiling 32 in an arrangement based on the arrangement of the plurality of frame magnets 26.

In an embodiment, the position of the frame magnet 26 and/or plurality of frame magnets 26 on the frame 22 may be adjusted circumferentially. For example, the tether 28 may be configured to be removably attached to the frame 22 or may be configured to be slidingly adjusted relative to the inner perimeter 25 of the frame.

Figure 4:
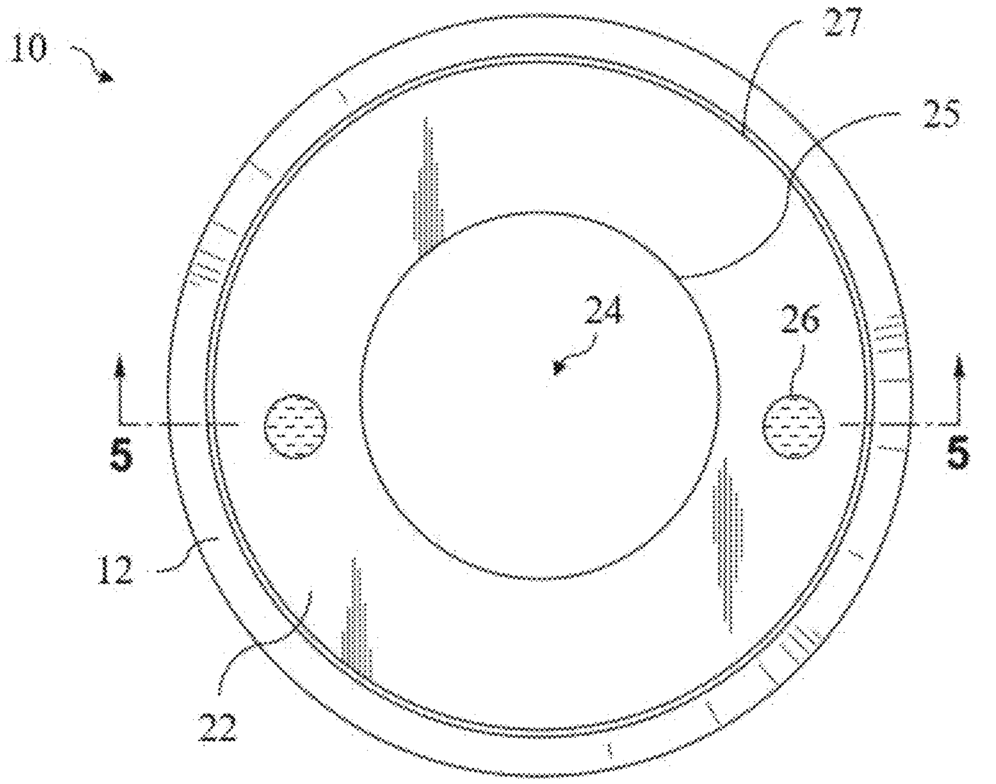
FIG. 4 is a bottom isometric view of an embodiment of the decoration assembly wherein the frame magnets are located on the frame.
Figure 5:
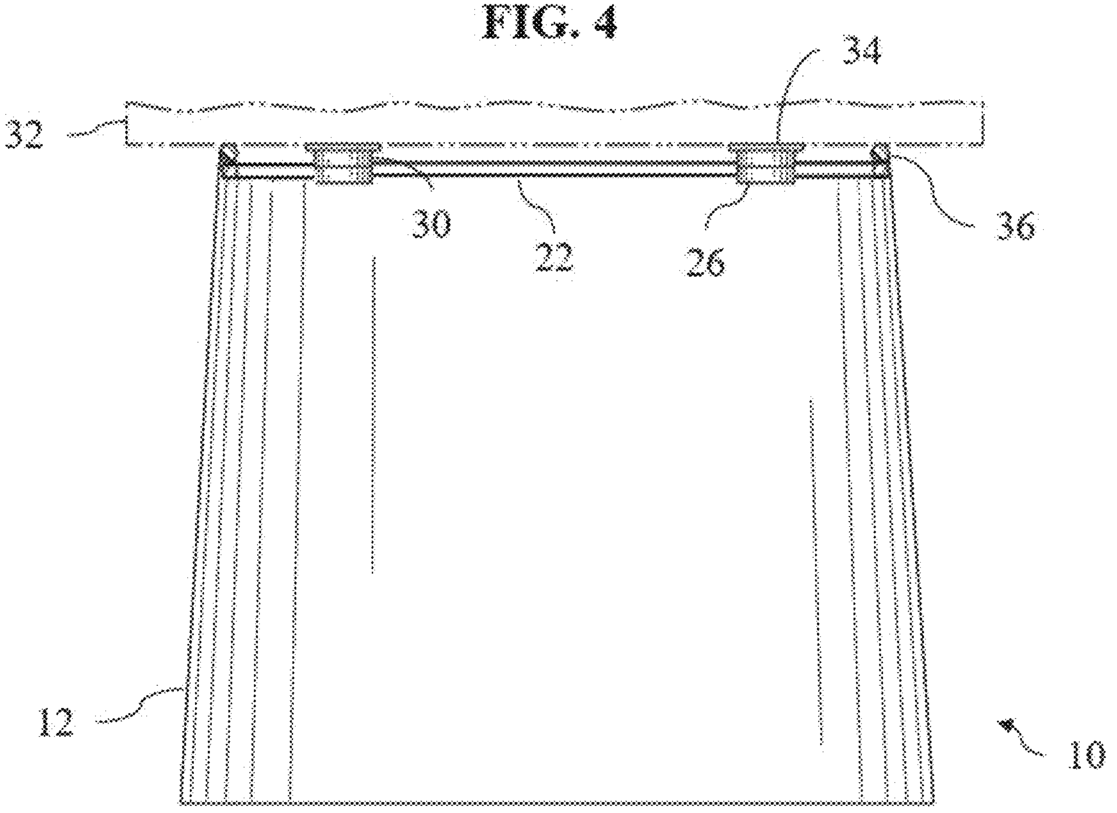
FIG. 5 is a cross-sectional side view of the decoration shown in FIG. 4 detachably coupled to ceiling magnets attached to a ceiling.

Referring to FIGS. 4 and 5, in an embodiment, the frame 22 is configured to detachably coupled to the plurality of ceiling magnets 30. For example, the frame 22 may be entirely or partially composed of a magnetic or metallic material such that the frame 22 can be magnetically attached to the plurality of ceiling magnets 30. The plurality of ceiling magnets 30 may be positioned on the ceiling 32 such that the plurality of ceiling magnets 30 are in contact with the frame 22 (e.g., where the frame 22 is circular the plurality of ceiling magnets 30 are positioned on the ceiling 30 such that the plurality of ceiling magnets 30 are located on a circumference defined by the inner perimeter 25 and the outer perimeter 27). The frame 22 and/or the plurality of ceiling magnets 30 are suitably sized to secure the decoration 12 to the ceiling 32. For example, the frame 22 may be size such that a surface of the plurality of ceiling magnets 30 is in full or partial contact with the frame 22. In other words, the frame 22 may have a width defined by the inner perimeter 25 and the outer perimeter 27 that is configured to be in contact with the plurality of ceiling magnets 30.

Figure 12:
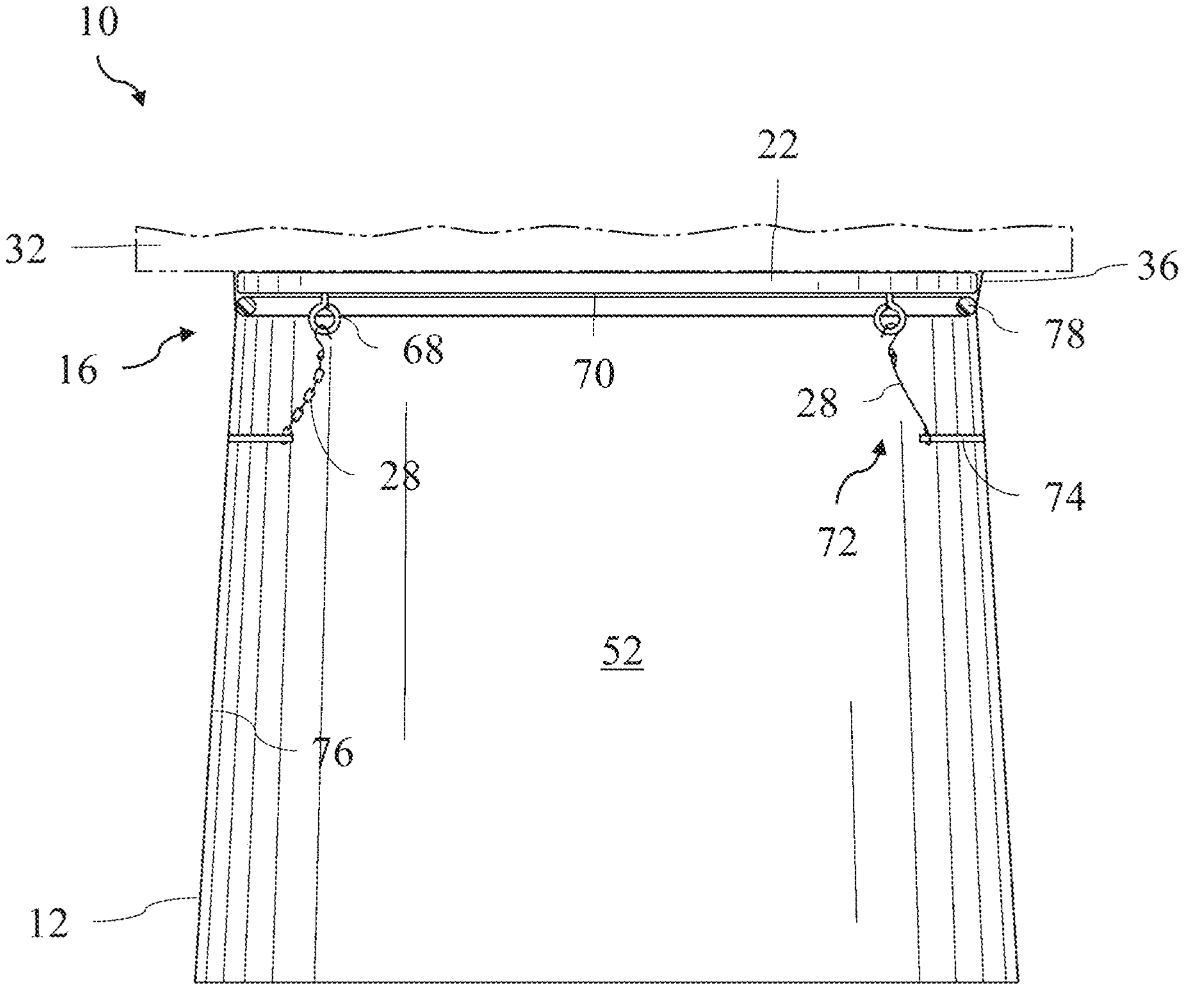
FIG. 12 is a cross-sectional side view of an embodiment of the decoration assembly, wherein the frame is mounted to the ceiling and includes a plurality of connectors, and wherein the decoration includes a plurality of couplers for detachably coupling to the plurality of connectors.

Referring to FIGS. 3 and 12, in an embodiment the decoration 12 includes a light seal 36 adjacent the upper end 16 for restricting a passage of light from the light fixture. The light seal 36 can be configured to align around or extend along a side of the frame. When the frame 22 is detachably coupled to the ceiling 32, the light seal 36 contacts or is pressed against the ceiling 32. In some embodiments, the frame 22 includes the light seal 36.

Figure 6:
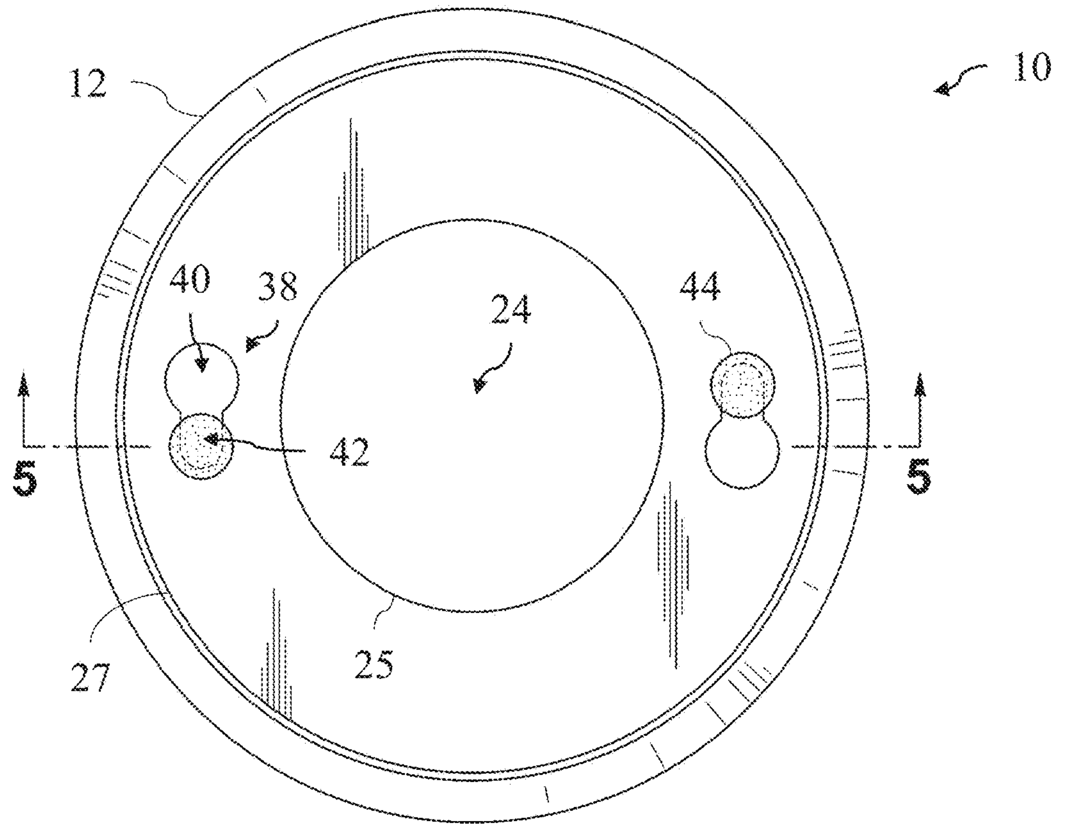
FIG. 6 is a bottom isometric view of an embodiment of the decoration assembly including at least two pods detachably coupled to the frame.
Figure 7:
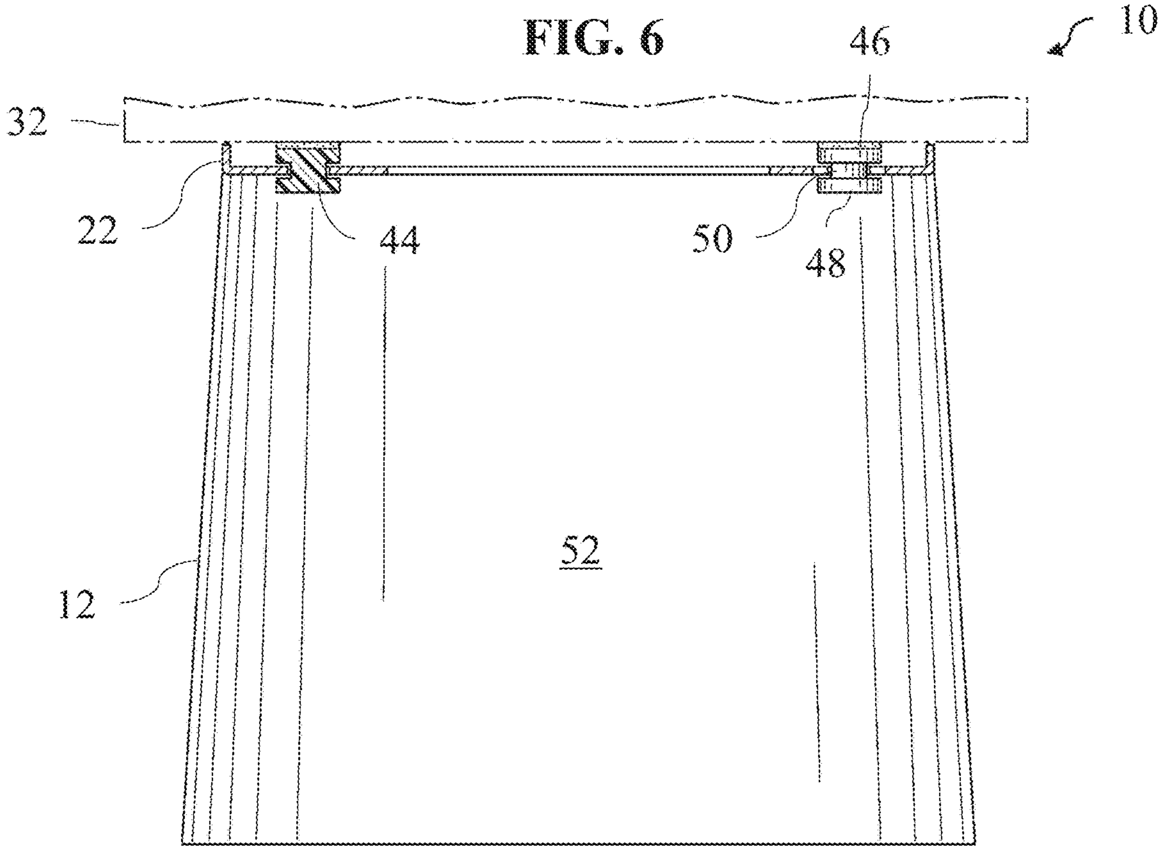
FIG. 7 is a cross-sectional side view of the decoration assembly shown in FIG. 6 wherein the at least two pods are mounted to the ceiling.

Referring to FIGS. 6 and 7, in an embodiment the frame 22 includes a slot 38 between the inner perimeter 25 and the outer perimeter 27. The outer perimeter 27 may be defined by an outer diameter, or the like. The slot 38 includes a slot opening 40 and a channel 42 extending from the slot opening 40. A pod 44 is configured to be mounted to the ceiling 32 and is configured to be detachably coupled to the frame 22 by the slot 38. The pod 44 has an upper pod end 46, a lower pod end 48 opposite the upper pod end 46, and a central pod portion 50 connecting the upper pod end 46 to the lower pod end 48.

The upper pod end 46 may be configured for being directly attached to the ceiling 32 (e.g., the upper pod end 46 may include an adhesive, magnet, fastener (including a hook and loop fastener) or the like, for being mounted to the ceiling 32). The lower pod end 48 is configured to be inserted into and through the slot opening 40 such that the lower pod end 48 protrudes through the frame 22 and may be relatively spaced apart from the frame 22 (i.e., the lower pod end 48 may be vertically inserted into the slot opening 40). In some embodiments, the lower pod end 48 protrudes through the frame 22 into an interior 52 of the decoration 12.

The lower pod end 48 is configured to be unable to pass through and/or move into the channel 42 while the central pod portion 50 is configured to move within the channel 42. In other words, the channel 42 and the central pod portion 50 are sized and/or shaped accordingly to permit translational movement of the central pod portion 50 within the channel 42. The translational movement of the central pod portion 50 into or within the channel 42 can be provided by rotation of the frame 22 relative to the pod 44, or vice versa. In other words, the translating the frame 22 radially around or relative to the central portion 24 can adjust the position of the central pod portion 50 in the slot 38.

The pod 44 has a pod height defined by a distance between the upper pod end 46 and the lower pod end 48 that is greater than a frame height or thickness. The central pod portion 50 may have a central pod height equal to or greater than the frame height or thickness. In some embodiments, the frame height or thickness is at least 3 mm or ⅛ inches. In some embodiments, the frame height or thickness is within a range from ⅛-6 inches, 6-12 inches, or the like, or a combination or sub-combination thereof.

For example, in use, the upper pod end 46 is attached to the ceiling 32 such that the pod 44 extends from the ceiling 32. The slot opening 40 is aligned with the lower pod end 48 and the frame 22 is translated vertically such that the lower pod end 48 is inserted into the interior 52 of the decoration 12. The frame 22 is then rotated to slidingly position the central pod portion 50 within the channel 42. In this way, the frame 22 and the decoration 12 are secured to the ceiling 32 by the pod 44. In other words, the lower pod end 48 supports the frame 22 and the decoration 12 as a result of the lower pod end 48 having a size/shape that is larger or different from the channel 50, and the attachment of the upper pod end 46 to the ceiling 32 is sufficient to support the weight of the frame 22 and decoration 12. The frame 22 may be removed by reversing the process above, such as rotating the frame 22 to align the lower pod end 48 with the opening 40 and lowering the frame 22 away from the ceiling 32 and/or pod 44.

In an embodiment, the decorative assembly 10 includes at least two pods 44, wherein the frame 22 includes at least two slots 38 for detachably coupling the at least two pods 44 to the frame 22. In some embodiments, the at least two slots 38 are disposed opposite each other or uniformly on the frame 22. In this way, the at least two pods 44 are configured to distribute the load of the frame 22 and decoration 12 between each other, or provide an easy to understand and ergonomic coupling or decoupling to the frame 22, or the like.

In an embodiment, the pod 44 has a side cross-sectional I-shape, wherein the upper pod end 46 and the lower pod end are circular, rectangular, triangular, or the like. In some embodiments, the pod 44 has an hourglass-like shape.

Figure 8:
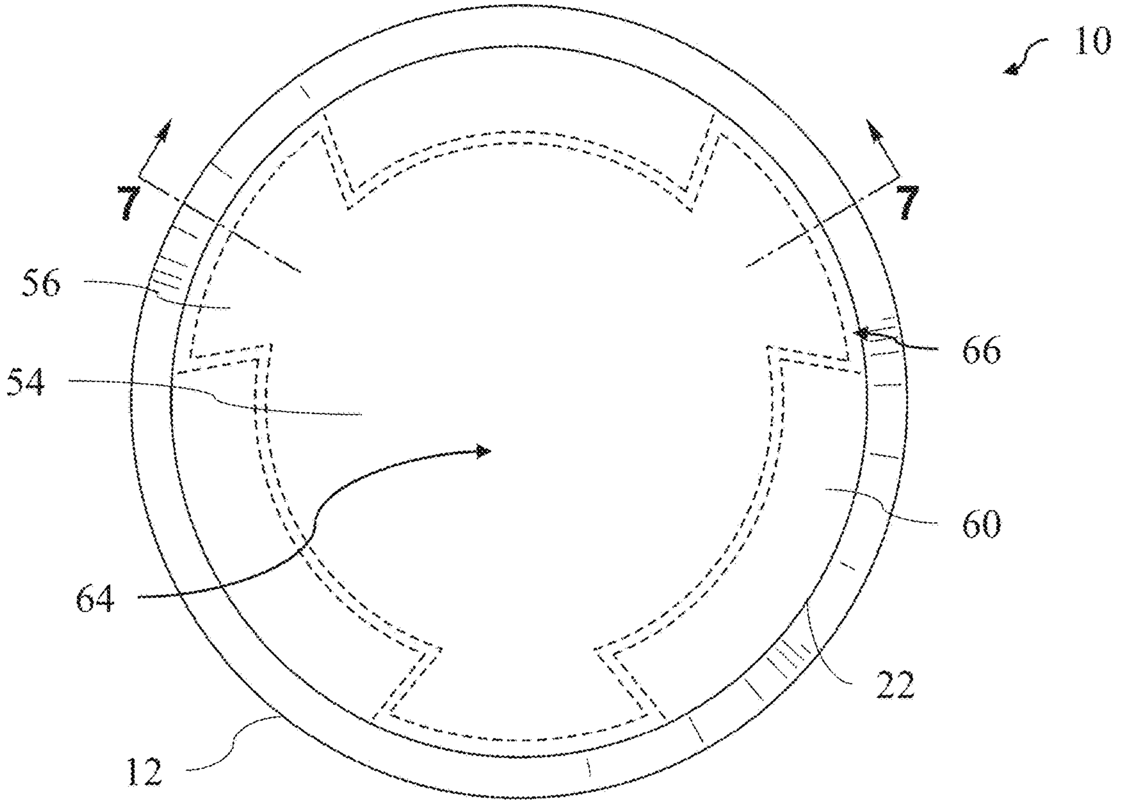
FIG. 8 is a bottom isometric view of an embodiment of the decoration assembly, wherein the decoration includes a mounting mechanism configured to be detachably coupled to the frame.
Figure 9:
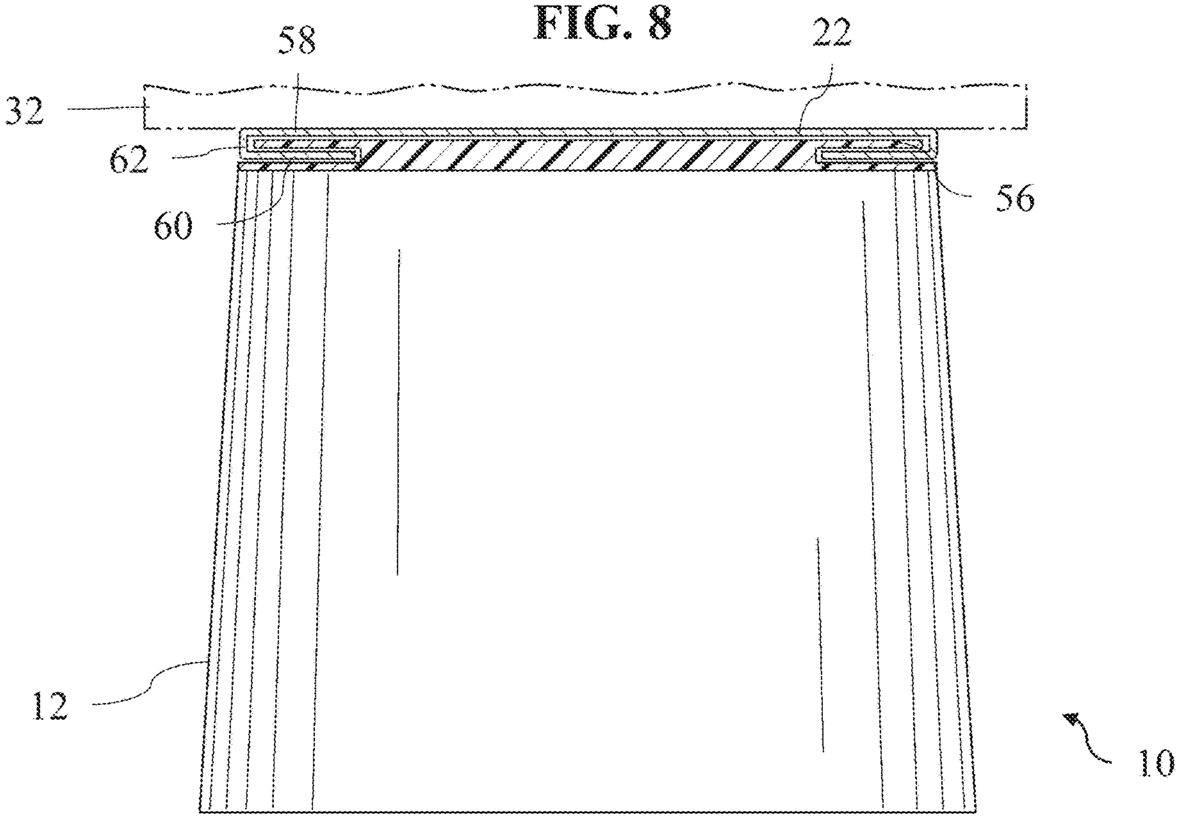
FIG. 9 is a cross-sectional side view of the decoration assembly shown in FIG. 8 wherein the frame is mounted to the ceiling.

Referring to FIGS. 8 and 9, in an embodiment the frame 22 is separate from the decoration 12 (i.e., the frame 22 and decoration 12 are not integrally formed together). The decoration 12 includes a mounting mechanism 54 adjacent the upper end 16, wherein the mounting mechanism 54 has a protrusion 56 that extends outwardly toward the side surface 20 and/or parallel to the upper end 16. In some embodiments, the mounting mechanism 54 has an annular shape and the protrusion 56 extends outwards radially. The protrusion 56 may be wedge-shaped, rectangular, cylindrical, or the like.

The frame 22 is configured to be mounted to the ceiling 32 and includes an upper portion 58, a lower portion 60 opposite the upper portion 58, and side wall 62 that defines the inner perimeter 25 and connects the upper portion 58 and the lower portion 60. The lower portion 60 extends from the side wall 62 toward the central portion 24. The lower portion 60 defines an aperture 66 for receiving the protrusion 56 (i.e., a slot, gap, opening, or the like, that has a size and shape configured to allow the protrusion 56 to pass through vertically). The upper portion 58, lower portion 60, and side wall 62 define a cavity 64 for housing the mounting mechanism 54. In some embodiments, the frame 22 has an annular shape or is cylindrical.

The mounting mechanism 54 is configured to be detachably coupled to the frame by the protrusion 56. For example, the protrusion 56 is aligned with the aperture 66 and the mounting mechanism 54 is translated vertically such that the protrusion 56 pass through the aperture 66 and into the cavity 64. The mounting mechanism 54 can then be rotated such that the protrusion 56 is positioned above the lower portion 60. In this way, the protrusion 56 rests on or is supported by the lower portion 60 such that the decoration 12 is secured to and suspending from the ceiling 32. To decouple the decoration 12 from the frame 22, the process is reversed, wherein the mounting mechanism 54 is rotated to align the protrusion 56 with the aperture 66 and the decoration 12 is lowered away (i.e., translated vertically) from the frame 22.

In an embodiment, the mounting mechanism 54 includes a plurality of protrusions 56 and the frame 22 includes a plurality of lower portions 60, wherein the plurality of lower portions 60 define a plurality of apertures 66 between the plurality of lower portions 60. The plurality of apertures 66 may be configured for receiving the plurality of protrusions 56 or a respective one of the plurality of protrusions 56. For example, the plurality of apertures 66 and the plurality of protrusions 56 may have a unique size and shape for matching the respective ones of the plurality of protrusions 56 to a respective one of the plurality of apertures 66. When the mounting mechanism 54 is inserted into the cavity 64 and rotated, the plurality of protrusions 56 are each positioned above a respective one of the plurality of lower portions 60. In some embodiments, the mounting mechanism 54 includes at least three protrusions 56.

In embodiments, the plurality of protrusions 56 may extend inward radially from the mounting mechanism 54 and the plurality of lower portions 60 may extend outward radially from the side wall 62, or the like, away from the central portion 24. For example, the mounting mechanism 56 may be configured to surround the frame 22, wherein the plurality of protrusions 56 extending inwardly can be rotated to be positioned above the plurality of lower portions 60 extending outwardly. In this way, the mounting mechanism 56 can be integral to the decoration 12 (i.e., made as a single piece, or the like) and the frame 22 may be obscured or fully covered by the mounting mechanism 56 to produce a visually clean line between the mounting mechanism 56 and the ceiling 32. In some embodiments, the mounting mechanism 56 may resemble or include aspects of the frame 22 (e.g., the upper portion 58, the lower portion 60, and/or the side wall 62, or the like).

In an embodiment, the mounting mechanism 54 includes an open center (e.g., a void, space, or opening) for allowing the light from the light fixture to pass through and into the interior 52 of the decoration 12. In some embodiments, the mounting mechanism 54 is composed of a transparent material.

Figure 10:
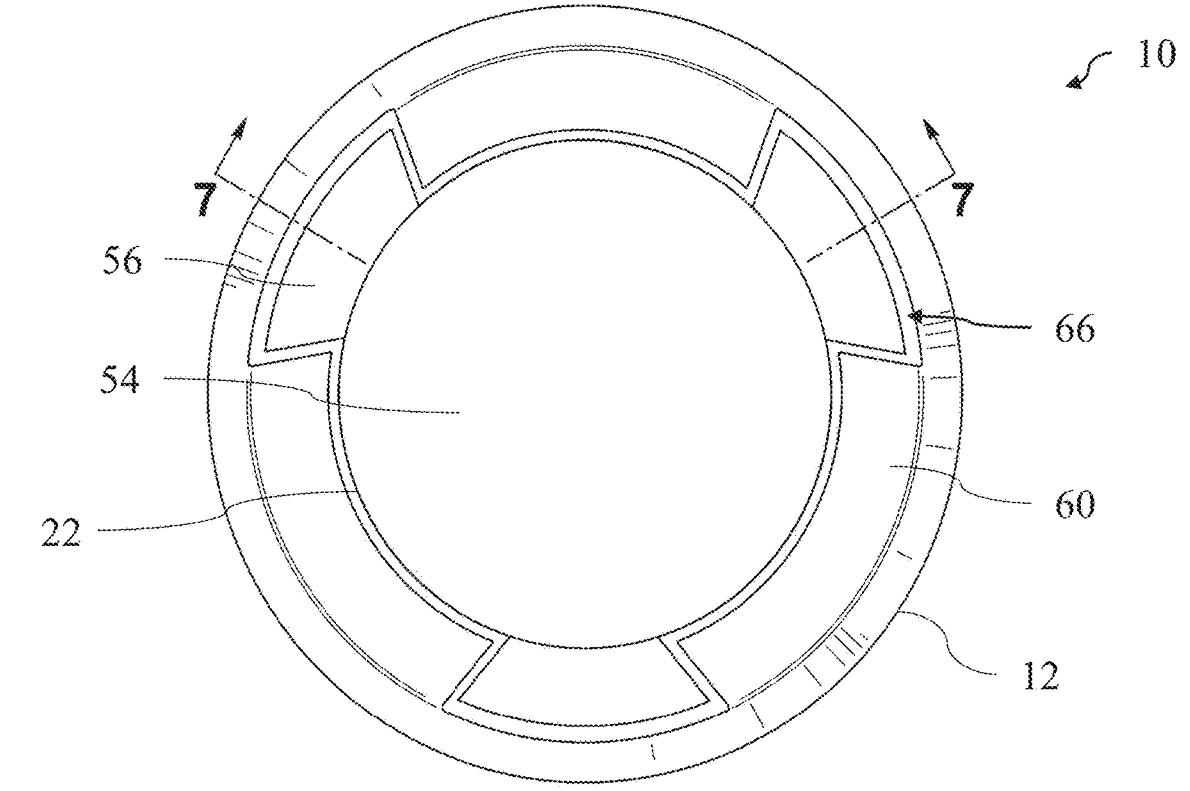
FIG. 10 is a cross-sectional side view of an embodiment of the decoration assembly, wherein the frame includes the mounting mechanism configured for detachably coupling to the decoration.
Figure 11:
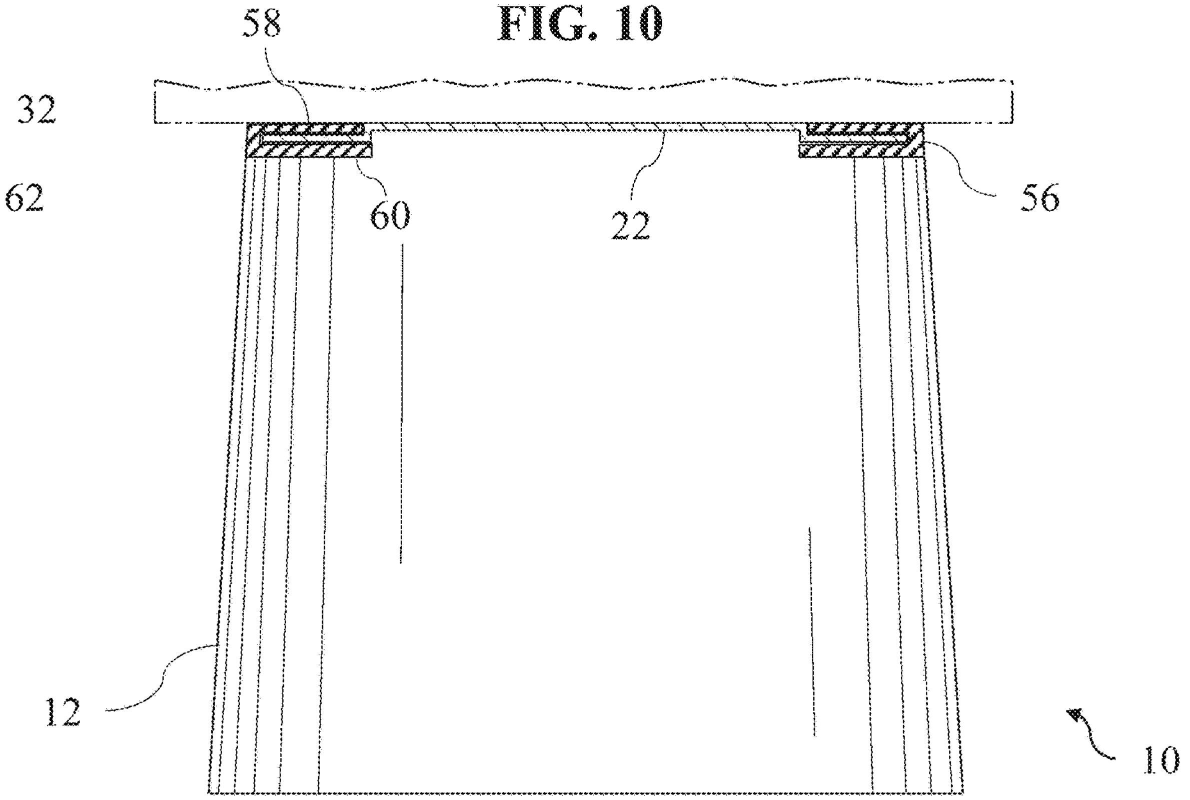
FIG. 11 is a cross-sectional side view of the decoration assembly shown in FIG. 10 wherein the frame is mounted to the ceiling.

Referring to FIGS. 10 and 11, in an embodiment, the frame 22 includes the mounting mechanism 54 with the protrusion 56, wherein the mounting mechanism 54 is disposed within the central portion 24 and/or spaced apart from the inner perimeter 25. In some embodiments, the mounting mechanism 54 defines the inner perimeter 25 and/or the outer perimeter 27. The decoration 12 includes the upper portion 58, the lower portion 60, and the side wall 62, wherein the upper portion 58 defines the aperture 66. For example, the aperture 66 of the upper portion 58 is aligned with the protrusion 56 and the decoration 12 is raised and rotated such that the protrusion 56 is positioned beneath the upper portion 58 such that the decoration 12 is secured to and suspending from the ceiling 32 (i.e., the upper portion 58 rests upon or is supported by the protrusion 56).

Referring to FIG. 12, in an embodiment, the frame 22 includes a plurality of connectors 68 extending from the frame 22. The plurality of connectors 68 may extend toward the central portion 24, away from the ceiling 32, or the like, or a combination or sub-combination thereof. For example, the frame 22 may have a lower surface 70, wherein the plurality of connectors 68 extend from the lower surface. The plurality of connectors 68 may be disposed between the inner perimeter 25 and the outer perimeter 40. In some embodiments, the plurality of connectors include a hook, loop, magnet, fastener, or the like.

The decoration 12 includes a plurality of couplers 72 that extend inward toward the interior 52 of the decoration 12 and are configured to be detachably coupled to a respective one of the plurality of connectors 68 to secure the decoration 12 to the ceiling 32. In some embodiments, the plurality of couplers 72 include tethers 28. In some embodiments, the plurality of couplers 72 include a tab 74 that extends inward from an interior surface 76 of the decoration 12, wherein an end of the tether 28 is attached to the tab 74. The plurality of couplers 72 may include a hook, magnet, fastener or the like for detachably coupling to the hook, loop, magnet, or fastener of the respective one of the plurality of connectors 68. In some embodiments, the decoration 12 includes a rim 78 adjacent the upper end 16 wherein the plurality of couplers 72 extend from the rim 78.

Figure 13:
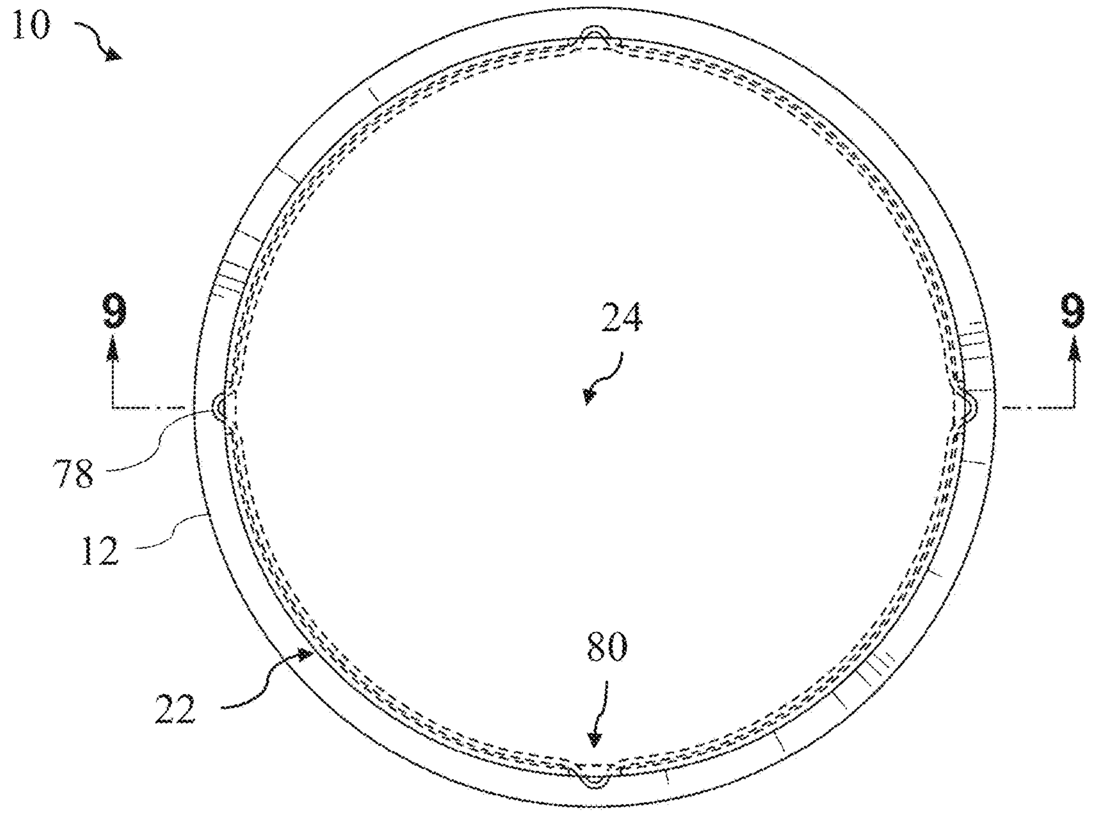
FIG. 13 is a top isometric view of an embodiment of the decoration assembly, wherein the decoration includes a rim that is configured to be elastically deformed for detachably coupling to a frame with at least one gap.
Figure 14:
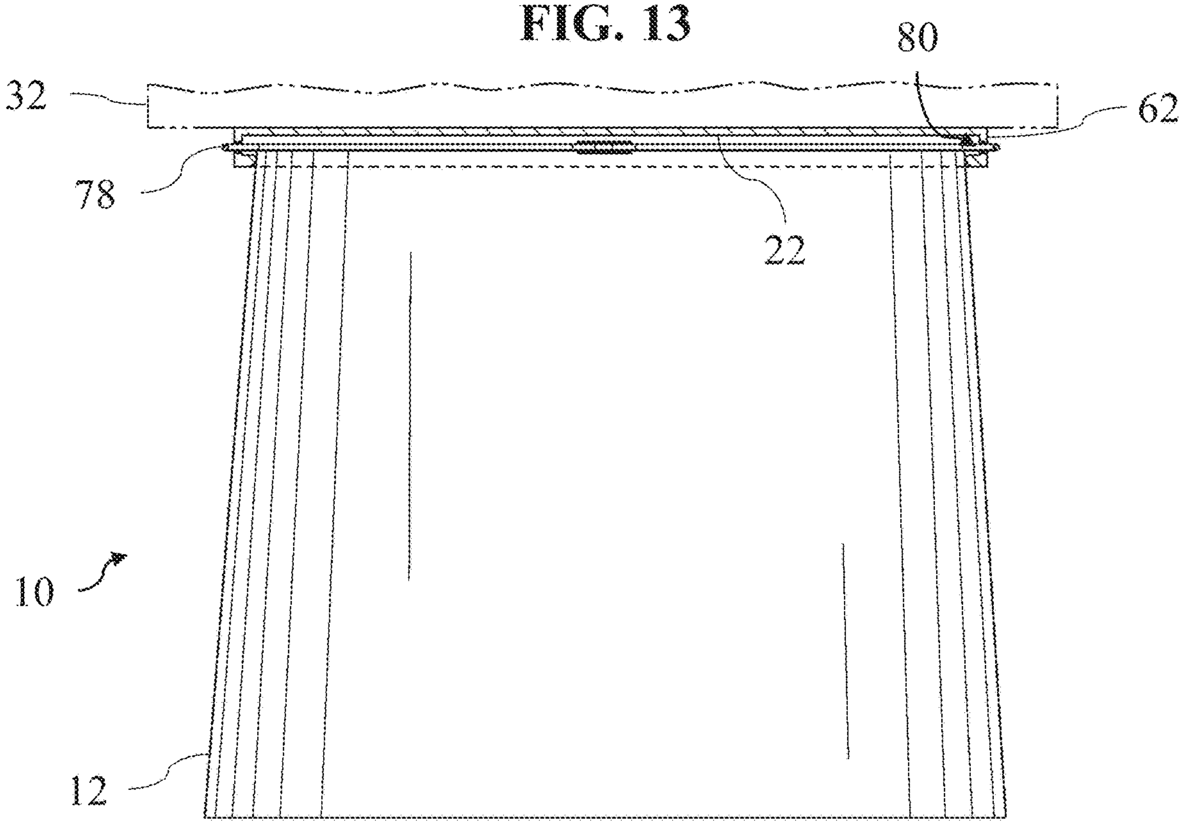
FIG. 14 is a cross-sectional side view of the decoration assembly shown in FIG. 13 wherein the frame is mounted to the ceiling.

Referring to FIGS. 13 and 14, in an embodiment the rim 78 is configured to be elastically deformed. The rim 78 may be elastically deformed across the entirety of the rim 78 or in at least location on the rim 78. The frame 22 includes at least one gap 80 and the decoration 12 may be detachably coupled to the frame 22 by elastically deforming the rim 78 such that a portion of the rim 78 protrudes through or into the at least one gap 80. For example, the frame 22 may include four gaps 80 and the rim 78 may be elastically deformed by bending the rim 78 such that part of the rim 78 protrudes through or into each of the four gaps 80. The decoration 12 is detachably coupled to the frame 22 by the outward force applied by the portion of the rim 78 that is elastically deformed within the gaps 80 (i.e., the expansive force of the deformed rim 78). The decoration 12 may be detached from the frame 22 by pressing or pulling the rim 78 back through the gaps 80. In some embodiments, the at least one gap 80 is defined by the side wall 62.

In some embodiments, the rim 78 is inserted into the central portion 24 of the frame 22 and elastically deformed such that the rim 78 protrudes through or into the at least one gap 80 away from the central portion 24. In some embodiments, the 78 is positioned around the frame 22 (e.g., around the outer perimeter 27) and elastically deformed such that the rim 78 protrudes through or into the at least one gap 80 toward the central portion 24. The rim 78 may also detachably couple the decoration 12 to the frame 22 by a compressive force against the frame 22 as a result of the rim 78 surrounding the frame 22 and being elastically deformed to protrude through the at least one gap 80.

In some embodiments, the rim 78 protruding through or into the at least gap 80 is also supported by the frame 22 (e.g., the frame 22 has a lower surface and the rim 78 protruding through the at least one gap 80 rests upon the lower surface). In some embodiments, the rim 78 includes an elastomeric, polymer, or the like, for providing increased friction against the frame 22 when protruding through the at least one gap 80. In some embodiments, the frame and/or the at least one gap 80 includes an elastomeric, polymer, or the like, for providing increased friction against the rim 78.

The at least one gap 80 may be an ident, recess, void, or the like. In an embodiment, the at least one gap 80 may extend from the inner perimeter 25 to the outer perimeter 27, such that the rim 78 may protrude through the at least one gap 80 past the inner 25 or outer perimeter 27. In an embodiment, the at least one gap 80 may extend into the side wall 62 to a point between the inner perimeter 25 and the outer perimeter 27, such that the rim 78 may protrude or be inserted into the at least one gap 80 (e.g., the at least one gap 80 may be an indent or recess sized to hold the elastically deformed portion of the rim 78). In other words, the rim 78 is configured to be elastically deformed into the at least one gap 80 and be detachably secured to the frame 22. As described above, the at least one gap 80 may extend from the inner perimeter 25 or the outer perimeter 27 to a point between the inner perimeter 25 and the outer perimeter 27.

Figure 15:
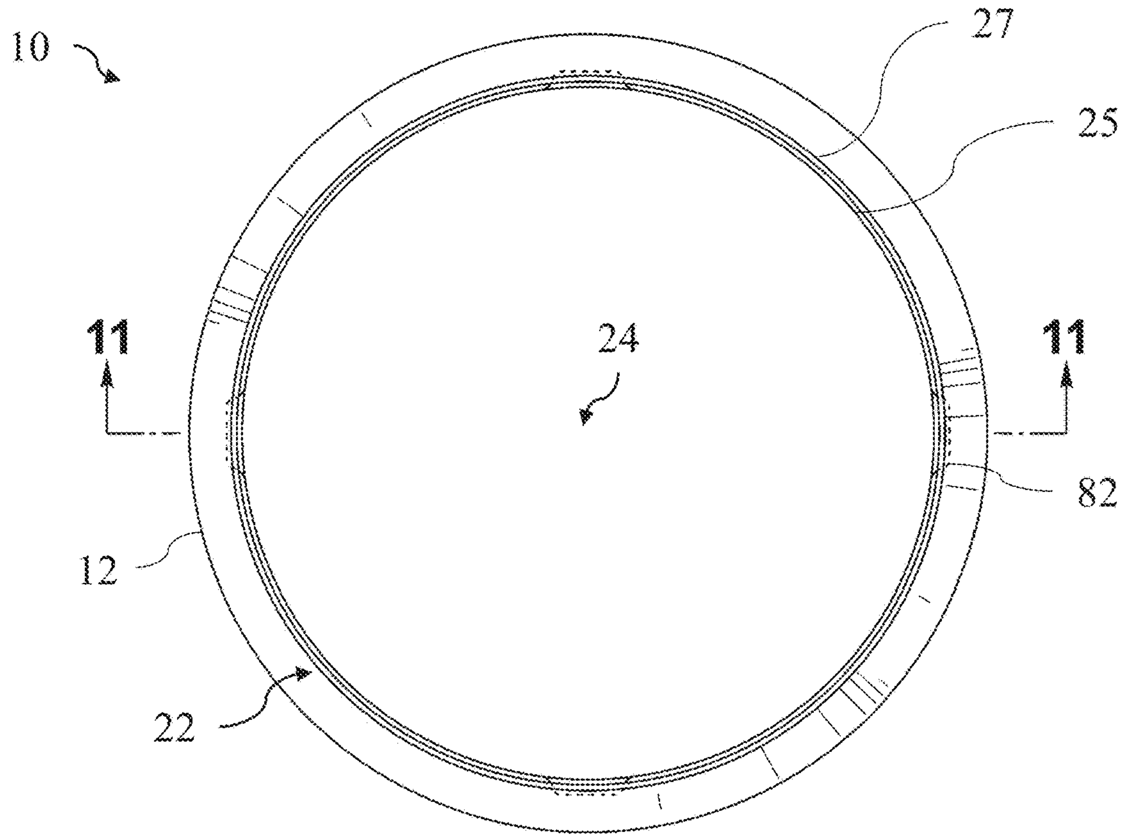
FIG. 15 is a top isometric view of an embodiment of the decoration assembly, wherein the frame includes at least two projections.
Figure 16:
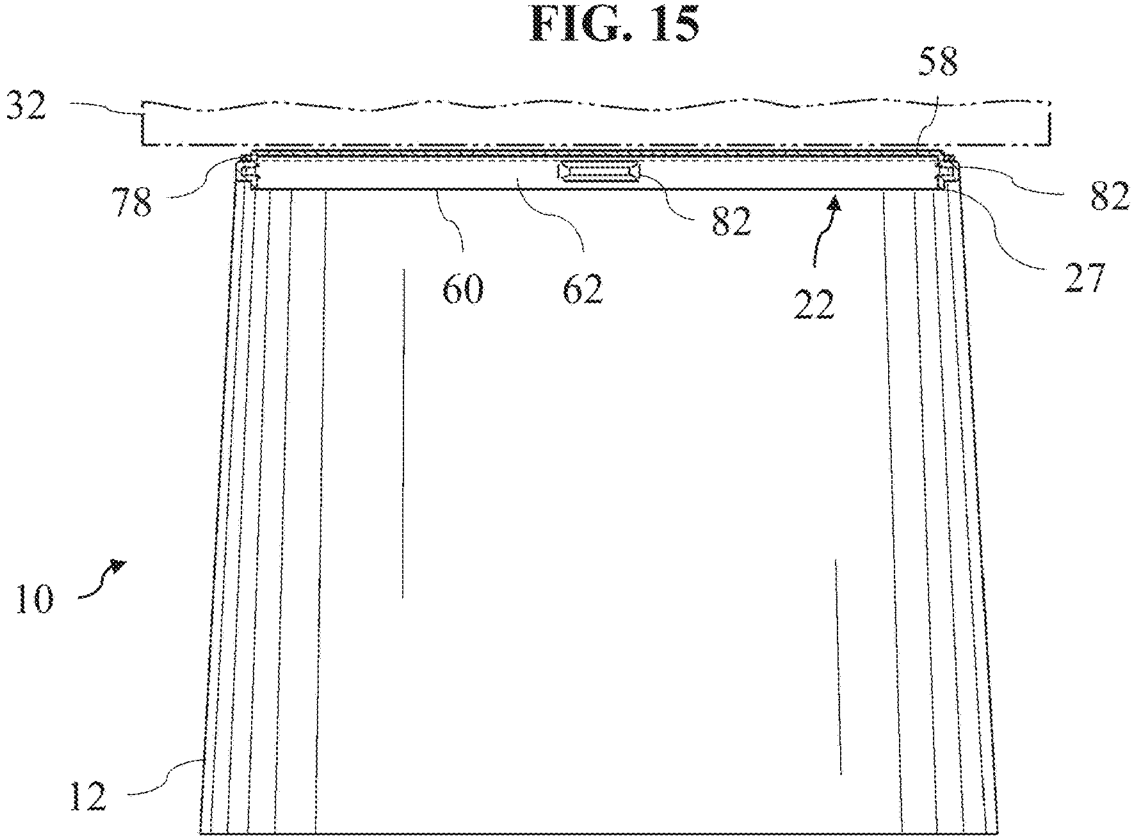
FIG. 16 is a cross-sectional side view of the decoration assembly shown in FIG. 13 wherein the frame is mounted to the ceiling and the rim of the decoration is in contact with an outer perimeter of the frame above the at least two projections.
Figure 17:
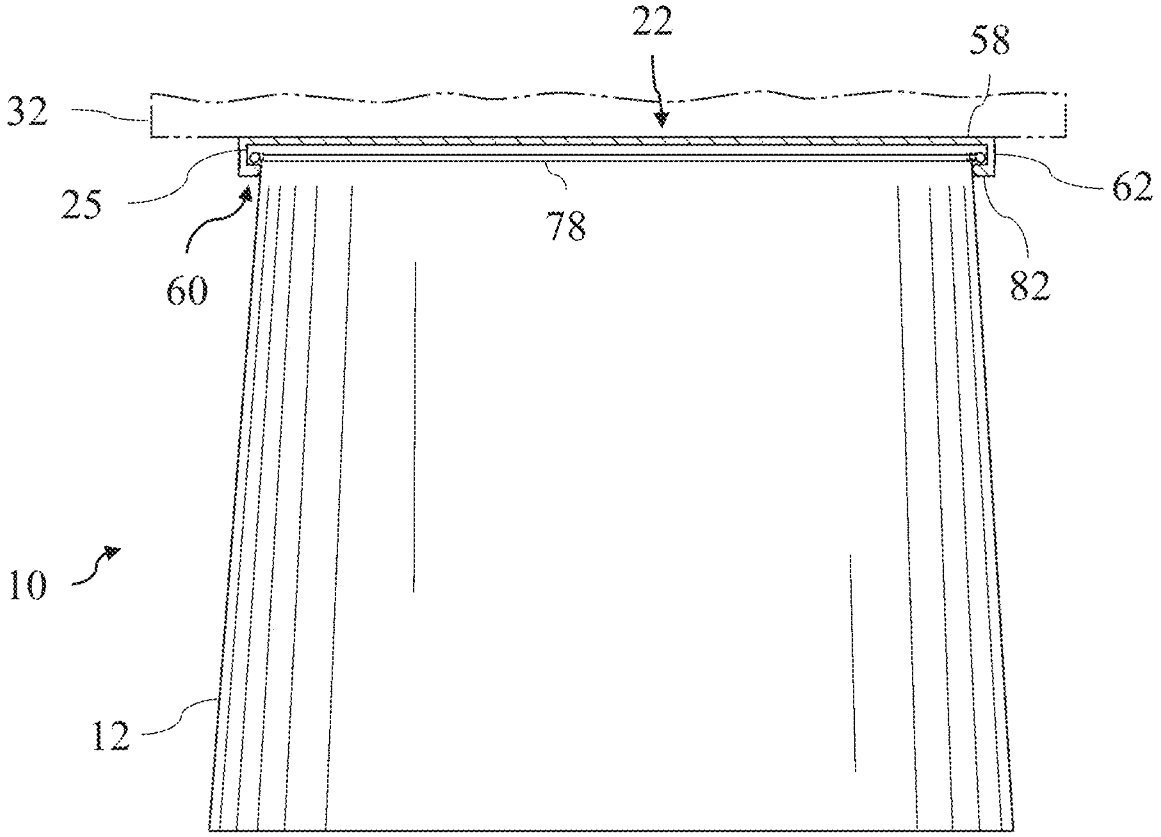
FIG. 17 is a cross-sectional side view of the decoration assembly wherein the frame is mounted to the ceiling and the rim of the decoration is in contact with an inner perimeter of the frame above the at least two projections.

Referring to FIGS. 15-17, in an embodiment the frame 22 includes at least two projections 82. The at least two projection 82 may extend inward toward the central portion 24 of the frame 22 or outward from the outer perimeter 27 of the frame 22 and away from the central portion 24. The at least two projections 82 may extend from the side wall 62 of the frame 22 adjacent to, spaced apart from, or distal to the upper portion 58 or the lower portion 60. The decoration 12 may be detachably coupled to the frame 22 by elastically deforming the rim 78 to bypass the at least two projection 82. The rim 78 may rest upon or be supported by the at least two projection 82. In some embodiments, the at least two projections 82 are uniformly or non-uniformly distributed along the side wall 62.

As shown in FIGS. 15 and 16, the at least two projections 82 extend outward from the outer perimeter 27 of the frame 22 and away from the central portion 24. The at least two projections 82 are spaced apart from the upper portion 58 (i.e., the at least two projections 82 are located between the upper portion 58 and the lower portion 60). The decoration 12 may be detachably coupled to the frame 22 and positioned around the outer perimeter 27 by elastically deforming or expanding the rim 78 to bypass the at least two projection 82. In some embodiments, the rim 78 has a lesser perimeter than the outer perimeter 27 and applies an inward force against the side wall 62 (i.e., compressive force) to detachably couple the decoration 12 to the frame 22. In some embodiments, the at least two protrusions 82 are not visible when the decoration 12 is detachably coupled to the frame 22 (e.g., the decoration 12 and/or the light seal 36 cover the at least two protrusions 82).

As shown in FIG. 17, the at least two projections 82 may extend from the inner perimeter 25 of the frame 22 distal to the upper portion 58 (i.e., the lower portion 60). The rim 78 may be inserted into the central portion 24 by elastically deforming or compressing the rim 78 to move the rim 78 past the at least two projections 82. In some embodiments, the rim 78 has a greater perimeter than the inner perimeter 25 and applies an outward force against the side wall 62 (i.e., expansive force) to detachably couple the decoration 12 to the frame 22. In some embodiments, the decoration 12 and/or light seal 36 cover the frame 22 (i.e., obscure the outer perimeter 27 of the frame 22).

In an embodiment, the decoration 12 is configured to be detachably coupled to the frame 22 by elastically deforming the rim 78 to be in contact with the side wall 62 (e.g., the inner perimeter 25 or the outer perimeter 27), wherein the rim 78 or the side wall 62 include a polymer for detachably securing the decoration 12 to the frame 22 by friction. In this way, the decoration 12 is held in place by static friction between the rim 78 and the side wall 62.

In an embodiment, the frame 22 configured to be mounted to the ceiling 32 by various means, such as an adhesive, fastener, magnet, staple, screw, band, or the like.

Other embodiments can include one or more of the following items.

1. A decorative assembly for covering and decorating a light fixture on a ceiling, comprising:
   - a decoration with an upper end and a lower end opposite the upper end, the decoration comprises a frame adjacent the upper end and has an open central portion that is unobstructed;
   - a ceiling magnet configured to be directly attached to the ceiling for the decorative assembly;
   - a frame magnet extends from the frame inward toward the open central portion for detachably coupling with the ceiling magnet and configured to secure the decoration to the ceiling; and
   - the decorative assembly does not comprise the light fixture and, when assembled, no part of the decorative assembly contacts the light fixture.

2. The decorative assembly wherein the frame magnet comprises a plurality of frame magnets that extend inward from the frame toward the open central portion, and the ceiling magnet comprises a plurality of ceiling magnets for detachably coupling to respective ones of the frame magnets.

3. The decorative assembly wherein each of the frame magnets is coupled to the frame with a tether, and the ceiling magnets are configured to be attached to the ceiling with adhesives or fasteners.

4. The decorative assembly wherein the tether comprises a chain or a string.

5. The decorative assembly wherein each of the frame magnets are coupled to the frame with a respective protrusion.

6. The decorative assembly wherein the decorative assembly is configured to be secured to the ceiling only by magnetic force.

7. The decorative assembly wherein the frame has an inner diameter and the plurality of ceiling magnets are configured to be attached to the ceiling within the inner diameter.

8. A decorative assembly for covering and decorating a light fixture on a ceiling, comprising:

a decoration with an upper end and a lower end opposite the upper end, the decoration comprises a frame adjacent the upper end and has an open central portion that is unobstructed; and at least two pods configured to be mounted to the ceiling and configured to be detachably coupled to the frame opposite each other to secure the decoration to the ceiling; and the decorative assembly does not comprise the light fixture and, when assembled, no part of the decorative assembly contacts the light fixture.

9. The decorative assembly wherein the at least two pods include an upper pod end, a lower pod end opposite the upper pod end, and a central pod portion connecting the upper pod end and the lower pod end;

wherein the upper pod end is configured for being directly attached to the ceiling; and wherein the at least two pods protrude through the frame when the at least two pods are detachably coupled to the frame such that the upper pod end and the lower pod end are spaced apart from the frame.

10. The decorative assembly wherein the frame includes at least two slots each having an opening and a channel extending from the opening;

wherein the lower pod ends of the at least two pods can pass through opening and cannot pass through the channel; and wherein the at least two pods are coupled to the frame by inserting the lower pod ends into the opening and sliding the central pod portion into the channel.

11. The decorative assembly wherein the central pod portion of the at least two pods is inserted into the channels of a corresponding one of the at least two slots by rotating the frame.

12. The decorative assembly wherein the decorative assembly is configured to be secured to the ceiling only by the at least two pods.

13. The decorative assembly wherein the upper pod end comprises an adhesive.

14. The decorative assembly wherein the upper pod end comprises a pod magnet or a hook and loop fastener for removably mounting the at least two pods to the ceiling.

15. The decorative assembly wherein the at least two pods have a side cross-sectional I-shape.

17. The decorative assembly wherein the at least two pods have an hourglass-like shape.

18. The decorative assembly wherein the frame has an outer diameter and an inner diameter, and wherein the at least two pods are configured to be detachably coupled to the frame between the outer diameter and the inner diameter of the frame.

19. A decorative assembly for covering and decorating a light fixture on a ceiling, comprising:

a decoration having an upper end, a lower end opposite the upper end, and a mounting mechanism adjacent the upper end, wherein the mounting mechanism has a protrusion that extends outwardly;

a frame with an open central portion, wherein the frame comprises a side wall defining a perimeter of the frame, a lower portion extending from the side wall inward toward the open central portion, and an aperture defined by the lower portion for receiving the protrusion;

wherein the decoration is configured to be detachably coupled to the frame by the protrusion being inserted into the aperture and rotated such that the protrusion rests on the lower portion;

wherein the frame is configured to be mounted to the ceiling and configured to secure the decoration to the ceiling; and the decorative assembly does not comprise the light fixture and, when assembled, no part of the decorative assembly contacts the light fixture.

20. A decorative assembly for covering and decorating a light fixture on a ceiling, comprising:

a decoration having an upper end, a lower end opposite the upper end, and a mounting mechanism adjacent the upper end, wherein the mounting mechanism is annularly shaped and comprises a plurality of protrusions extending outward radially;

a frame with an annular shape and an open central portion, wherein the frame comprises a side wall defining a perimeter of the frame, a plurality of lower portions extending from the side wall inward toward the open central portion, and a plurality of apertures defined by the lower portions for receiving the respective ones of the plurality of protrusions;

wherein the mounting mechanism is configured to be detachably coupled to the frame by the plurality of protrusions being inserted into the plurality of apertures and rotated such that the plurality of protrusions rest on the each of the plurality of lower portions;

wherein the frame is configured to be mounted to the ceiling and configured to secure the decoration to the ceiling; and the decorative assembly does not comprise the light fixture and, when assembled, no part of the decorative assembly contacts the light fixture.

21. The decorative assembly wherein the frame includes an upper portion and the plurality of lower portions are opposite the upper portion;

wherein the side wall connects the upper portion to the plurality of lower portions;

wherein the upper portion, side wall, and the plurality of lower portions define a cavity; and wherein the cavity is configured for receiving the plurality of protrusions.

22. The decorative assembly wherein the plurality of apertures are disposed between each of the plurality of lower portions.

23. The decorative assembly wherein the mounting mechanism includes an open decoration portion for allowing a light to pass through the mounting mechanism.

24. The decorative assembly wherein the mounting mechanism includes a plurality of openings for allowing a light from the light fixture to pass through the mounting mechanism.

25. The decorative assembly wherein the mounting mechanism is composed of a material for allowing a light from the light fixture to pass through the mounting mechanism.

26. A decorative assembly for covering and decorating a light fixture on a ceiling, comprising:

a frame has an annular shape and a mounting mechanism, wherein the mounting mechanism comprises a plurality of protrusions extending outward radially;

a decoration having an upper end, a lower end opposite the upper end, wherein the decoration comprises a plurality of upper portions and a side wall adjacent the upper end, wherein plurality of the upper portions extends inwardly from the side wall and defines a plurality of apertures for receiving a respective one of the plurality of protrusions;

wherein the decoration is configured for detachably coupling to the frame by the plurality of protrusion being inserted into the plurality of apertures and rotated such that the plurality of upper portions rest on the respective one of the plurality of protrusions;

wherein the frame is configured to be mounted to the ceiling and for securing the decorative assembly to the ceiling; and the decorative assembly does not comprise the light fixture and, when assembled, no part of the decorative assembly contacts the light fixture.

27. A decorative assembly for covering and decorating a light fixture on a ceiling, comprising:

a frame with an upper surface, a lower surface opposite the upper surface, and a plurality of connectors, wherein the frame is configured to be mounted to the ceiling;

a decoration with an upper end, an open central portion that is unobstructed, and a plurality of couplers extending inwardly, wherein the plurality of connectors are configured to be detachably coupled respective to one of the plurality of connectors to secure the decoration to the ceiling; and the decorative assembly does not comprise the light fixture and, when assembled, no part of the decorative assembly contacts the light fixture.

28. The decorative assembly wherein the frame has an outer diameter and an inner diameter, wherein the plurality of connectors are disposed between the outer diameter and the inner diameter of the frame, and wherein the plurality of connectors extend from the lower surface of the frame.

29. The decorative assembly wherein the plurality of couplers comprise a tether.

30. The decorative assembly wherein the tether comprises a chain or a string.

31. The decorative assembly wherein the plurality of couplers each comprise a tab that extends inward from an interior surface of the decoration toward the open central portion, and wherein an end the tether is attached to the tab.

32. The decorative assembly wherein the plurality of couplers comprise a coupling hook or coupling magnet at an end of the tether for detachably coupling to respective ones of the plurality of connectors.

33. The decorative assembly wherein the plurality of connectors include a connecting hook for detachably coupling to the coupling hook of respective ones of the plurality of couplers.

34. The decorative assembly wherein the plurality of connectors include a connecting loop for detachably coupling to the coupling hook of respective ones of the plurality of couplers.

35. The decorative assembly wherein the plurality of connectors include a connecting magnet for detachably coupling to the coupling magnet of respective ones of the plurality of couplers.

36. The decorative assembly wherein the plurality of connectors include a magnetic component for detachably coupling to the coupling magnet of respective ones of the plurality of couplers.

37. The decorative assembly wherein the decoration comprises a light seal adjacent the upper end for restricting a passage of light from a perimeter of the upper end.

38. The decorative assembly wherein the light seal contacts the lower surface of the frame.

39. The decorative assembly wherein the light seal contacts a side surface of the frame.

40. The decorative assembly wherein the light seal is configured to be positioned adjacent the upper surface of the frame.

41. The decorative assembly wherein the decoration comprises a rim and the plurality of couplers extending inwardly from the rim.

42. A decorative assembly for covering and decorating a light fixture on a ceiling, comprising:

a decoration with an upper end and a lower end opposite the upper end, the decoration comprises a frame adjacent the upper end and has an open central portion that is unobstructed;

a plurality of ceiling magnets configured to be directly attached to the ceiling and for detachably coupling to the frame to secure the decoration to the ceiling; and the decorative assembly does not comprise the light fixture and, when assembled, no part of the decorative assembly contacts the light fixture.

43. The decorative assembly wherein the frame has an inner perimeter and an outer perimeter and the plurality of ceiling magnets are configured to be attached to the frame within the inner perimeter and the outer perimeter.

44. The decorative assembly wherein the decorative assembly is configured to be secured to the ceiling only by magnetic force.

45. A decorative assembly for covering and decorating a light fixture on a ceiling, comprising:

a frame with an open central portion, wherein the frame comprises at least one gap;

a decoration with an upper end and a lower end opposite the upper end, the decoration comprises a rim adjacent the upper end, wherein the rim is configured to be elastically deformed;

wherein the decoration is configured to be detachably coupled to the frame by elastically deforming the rim such that a portion of the rim protrudes into the at least one gap;

wherein the frame is configured to be mounted to the ceiling and for securing the decoration to the ceiling; and the decorative assembly does not comprise the light fixture and, when assembled, no part of the decorative assembly contacts the light fixture.

46. The decorative assembly wherein the at least one gap includes four gaps.

47. The decorative assembly wherein the portion of the rim protruding into the at least one gap applies an outward force against the frame.

48. The decorative assembly wherein the portion of the rim protruding into the at least one gap is supported by the frame.

49. The decorative assembly wherein the rim includes a polymeric material for providing friction against the frame.

50. The decorative assembly wherein the portion of the rim protrudes into the at least one gap away from the open central portion of the frame.

51. The decorative assembly wherein the rim is configured to apply an outward force against an inner perimeter of the frame.

52. The decorative assembly wherein the portion of the rim protrudes into the at least one gap towards the open central portion of the frame.

53. The decorative assembly wherein the rim is configured to be positioned around an outer perimeter of the frame and apply a compressive force against the outer perimeter.

54. A decorative assembly for covering and decorating a light fixture on a ceiling, comprising:
- a frame with a central portion, wherein the frame comprises an upper portion, a side wall extending from the upper portion and defining an inner perimeter and outer perimeter, and at least two projections extending from the side wall;
- a decoration with an upper end and a lower end opposite the upper end, the decoration comprises a rim adjacent the upper end, wherein the rim is configured to be elastically deformed;
- wherein the decoration is configured to be detachably coupled to the frame by elastically deforming the rim to move the rim past the at least two projections;
- wherein the frame is configured to be mounted to the ceiling and for securing the decoration to the ceiling; and
- the decorative assembly does not comprise the light fixture and, when assembled, no part of the decorative assembly contacts the light fixture.

55. The decorative assembly wherein the at least two projections are configured to support the rim.

56. The decorative assembly wherein the at least two projections are spaced apart from the upper portion of the frame.

57. The decorative assembly wherein the at least two projections extend from the inner perimeter toward the central portion; and
- wherein the rim has a greater perimeter than the inner perimeter of the frame and is configured to be inserted into the central portion for applying an outward force against the side wall.

58. The decorative assembly wherein the at least two projections extend from the outer perimeter away from the central portion; and
- wherein the rim has a lesser perimeter than the outer perimeter of the frame and is configured to be positioned around the outer perimeter and apply a compressive force against the side wall.

59. The decorative assembly wherein the at least two projections are not visible when the decoration is detachably coupled to the frame.

60. A decorative assembly for covering and decorating a light fixture on a ceiling, comprising:
- a frame with a central portion, wherein the frame comprises an upper portion, a side wall extending from the upper portion and defining an inner perimeter and outer perimeter;
- a decoration with an upper end and a lower end opposite the upper end, the decoration comprises a rim adjacent the upper end, wherein the rim is configured to be elastically deformed;
- wherein the decoration is configured to be detachably coupled to the frame by elastically deforming the rim to be in contact with the side wall;
- wherein the rim or the side wall include a polymer for detachably securing the decoration to the frame by friction;
- wherein the frame is configured to be mounted to the ceiling and for securing the decoration to the ceiling; and
- the decorative assembly does not comprise the light fixture and, when assembled, no part of the decorative assembly contacts the light fixture.

61. The decorative assembly wherein the rim has a lesser perimeter than the outer perimeter of the frame and is configured to be positioned around the outer perimeter and apply a compressive force against the side wall.

62. The decorative assembly wherein the rim has a greater perimeter than the inner perimeter of the frame and is configured to be inserted into the central portion for applying an outward force against the side wall.

63. A decorative assembly for covering and decorating a light fixture on a ceiling, comprising:
- a decoration having an upper end, a lower end opposite the upper end, and a mounting mechanism adjacent the upper end, wherein the mounting mechanism is annularly shaped and comprises a plurality of protrusions extending inwardly;
- a frame with an annular shape and an open central portion, wherein the frame comprises
  - a side wall defining a perimeter of the frame,
  - a plurality of lower portions extending from the side wall outward away from the open central portion, and
  - a plurality of apertures defined by the lower portions for receiving the respective ones of the plurality of protrusions;
- wherein the mounting mechanism is configured surround the frame and to be detachably coupled to the frame by the plurality of protrusions being inserted through the plurality of apertures and rotated such that the plurality of protrusions rest on the each of the plurality of lower portions;
- wherein the frame is configured to be mounted to the ceiling and configured to secure the decoration to the ceiling; and
- the decorative assembly does not comprise the light fixture and, when assembled, no part of the decorative assembly contacts the light fixture.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated degrees or at other orientations) and the spatially relative descriptions used herein interpreted accordingly.

What is claimed is:

1. A decorative assembly for covering and decorating a light fixture on a ceiling, comprising:
   - a decoration with an upper end and a lower end opposite the upper end, the decoration comprises a frame integrally disposed adjacent the upper end and has an open central portion that is unobstructed;
   - a ceiling magnet configured to be attached to the ceiling and for detachably coupling to the frame to secure the decoration to the ceiling;
   - a frame magnet extending inward from the frame toward the open central portion for detachably coupling with the ceiling magnet, the frame magnet is coupled to the frame by a tether, and the ceiling magnet is configured to be attached to the ceiling with an adhesive or a fastener; and
   - the decorative assembly does not comprise the light fixture and, when assembled, no part of the decorative assembly contacts the light fixture.

2. The decorative assembly of claim 1 wherein the frame has an inner perimeter and an outer perimeter and the ceiling magnet is configured to be magnetically attached to the frame within the inner perimeter and the outer perimeter.

3. A decorative assembly for covering and decorating a light fixture on a ceiling, comprising:
   - a decoration having an upper end and a lower end opposite the upper end, the decoration comprising:
     - a mounting mechanism adjacent the upper end, wherein the mounting mechanism comprises a plurality of protrusions extending outward from the mounting mechanism, and wherein the mounting mechanism is composed of a transparent material for allowing light to pass through the mounting mechanism; and
     - a light seal adjacent the upper end for restricting a passage of light from a perimeter of the upper end;
   - a frame with an open central portion, wherein the frame comprises:
     - a side wall,
     - a plurality of lower portions extending inward from the side wall toward the open central portion, and
     - a plurality of apertures defined by the lower portions for receiving the respective ones of the plurality of protrusions;
     - wherein the decoration is configured to be detachably coupled to the frame by the plurality of protrusions being axially inserted through the plurality of apertures and rotated such that the plurality of protrusions rest on the each of the plurality of lower portions and that the decoration can be suspended from the frame;
     - wherein the frame is configured to be mounted to the ceiling and configured to secure the decoration to the ceiling such that the light seal surrounds the frame and contacts the ceiling; and
     - the decorative assembly does not comprise the light fixture and, when assembled, no part of the decorative assembly contacts the light fixture.

4. The decorative assembly of claim 3 wherein the frame includes an upper portion and the plurality of lower portions are opposite the upper portion;
   - wherein the side wall connects the upper portion to the plurality of lower portions;
   - wherein the upper portion, side wall, and the plurality of lower portions define a cavity; and
   - wherein the cavity is configured for receiving the plurality of protrusions.

5. A decorative assembly for covering and decorating a light fixture on a ceiling, comprising:
   - a frame comprising an open central portion, a side wall defining an inner perimeter and an outer perimeter of the frame, and at least two projections extending from a lateral surface of the side wall;
   - a decoration with an upper end and a lower end opposite the upper end, the decoration comprises a rim adjacent the upper end, wherein the rim is configured to be elastically deformed;
   - wherein the decoration is configured to be detachably coupled to the frame by elastically deforming the rim such that the rim can be axially moved to a position past the at least two projections and apply a force against the lateral surface of the side wall, wherein the position of the rim is maintained by the force against the side wall and the at least two projections;
   - wherein the frame is configured to be mounted to the ceiling and for securing the decoration to the ceiling such that the light fixture is aligned with the open central portion of the frame;

the decorative assembly does not comprise the light fixture;

the at least two projections extend from the outer perimeter away from the central portion; and the rim has a lesser perimeter than the outer perimeter of the frame and is configured to be surround the outer perimeter and apply a compressive force against the lateral surface of the side wall.

6. The decorative assembly of claim 5 wherein the at least two projections extend from the inner perimeter toward the central portion; and wherein the rim has a greater perimeter than the inner perimeter of the frame and is configured to be inserted into the central portion for applying an outward force against the lateral surface of the side wall.

7. The decorative assembly of claim 5 wherein the rim or the side wall include a polymer for detachably securing the decoration to the frame by friction.

8. The decorative assembly of claim 5 wherein the at least two projections are disposed between an upper portion and a lower portion of the side wall.

* * * * *